(12) United States Patent
Cyprus et al.

(10) Patent No.: US 8,424,074 B2
(45) Date of Patent: Apr. 16, 2013

(54) METHOD FOR DEPLOYING A FIREWALL AND VIRTUAL PRIVATE NETWORK TO A COMPUTER NETWORK

(75) Inventors: Mark E. Cyprus, Sugar Land, TX (US); Jay F. Ferrill, Houston, TX (US)

(73) Assignee: Vendor Safe Technologies, Houston, TX (US)

( * ) Notice: Subject to any disclaimer, the term of this patent is extended or adjusted under 35 U.S.C. 154(b) by 476 days.

(21) Appl. No.: 12/486,133

(22) Filed: Jun. 17, 2009

(65) Prior Publication Data

US 2010/0325730 A1 Dec. 23, 2010

(51) Int. Cl.
*G06F 15/16* (2006.01)
*G06F 11/00* (2006.01)

(52) U.S. Cl.
USPC .............................................. 726/11; 726/23

(58) Field of Classification Search ................... 726/11, 726/23
See application file for complete search history.

(56) References Cited

U.S. PATENT DOCUMENTS 6,182,226 B1 1/2001 Reid
2002/0080752 A1* 6/2002 Johansson et al. ........... 370/338
2006/0031476 A1* 2/2006 Mathes et al. ................ 709/224
2010/0121903 A1* 5/2010 St. Pierre ...................... 709/202
2010/0199345 A1* 8/2010 Nadir ............................ 726/11

OTHER PUBLICATIONS

Juniper Networks Integrated Firewall/VPN Platforms, Juniper Networks—Product Category Brochure, pp. 1-8, May 2009.

* cited by examiner

*Primary Examiner* — Peter Shaw
(74) *Attorney, Agent, or Firm* — Karen B. Tripp

(57) ABSTRACT

This invention is an improved system and method of efficiently deploying a large scale roll out of secure networks, including a VPN, to clients with limited or non-existent technical staff. The invention allows for a person with minimal technical skills to install, and, if necessary, uninstall the solution. Through a series of automated and/or remotely-controlled steps provided through connections established from inside the site to a centralized system over an unprotected network, the site's network can be secured, updated, and/or reconfigured, and returned to its previous state if errors should occur. Furthermore, a virtual private network (VPN) can be established that allows multiple hosts on the VPN but on different local networks to have the same IP address. Additionally, without any additional hardware and as part of the installation process, the invention protects the site from unauthorized local network devices either by preventing them from passing traffic off the local network or by generating notification of their existence.

5 Claims, 31 Drawing Sheets

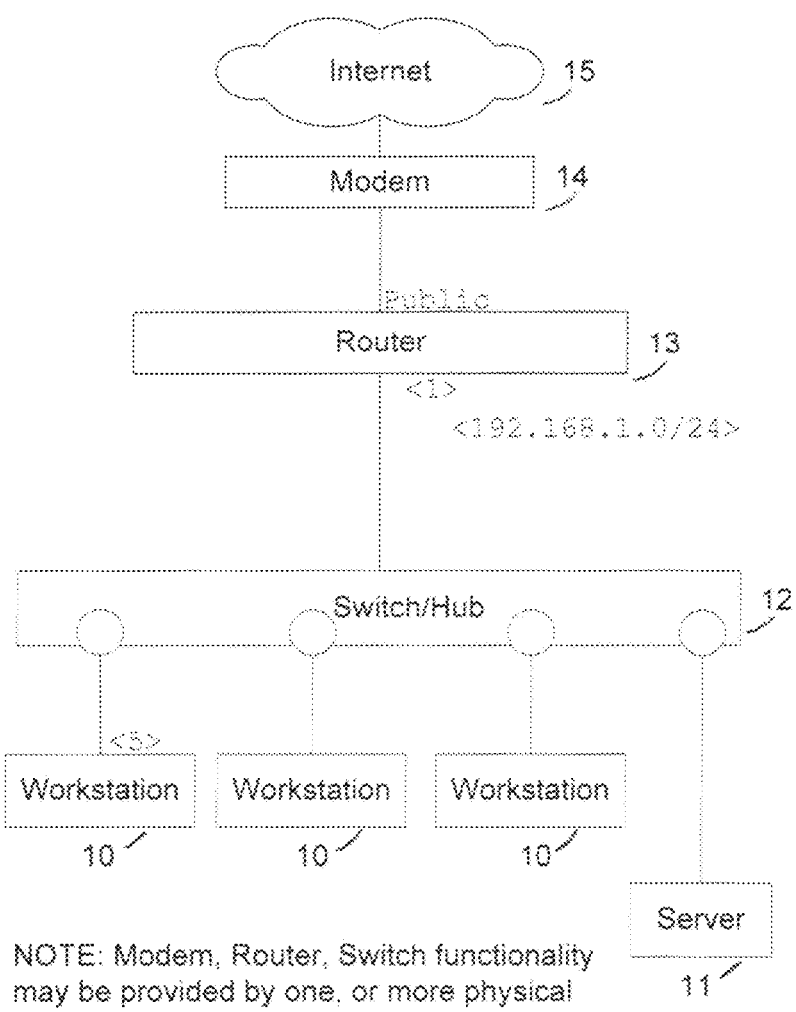

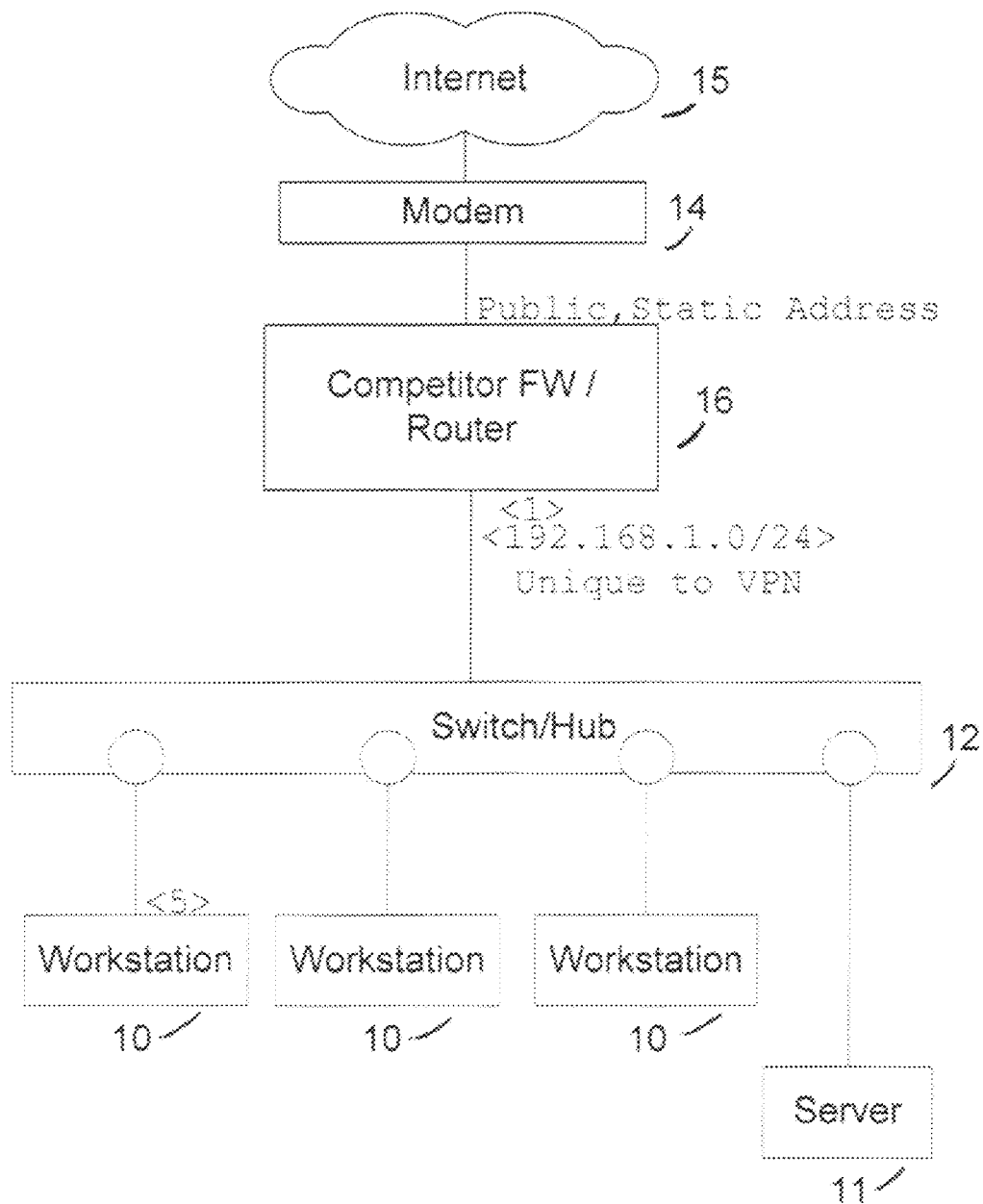

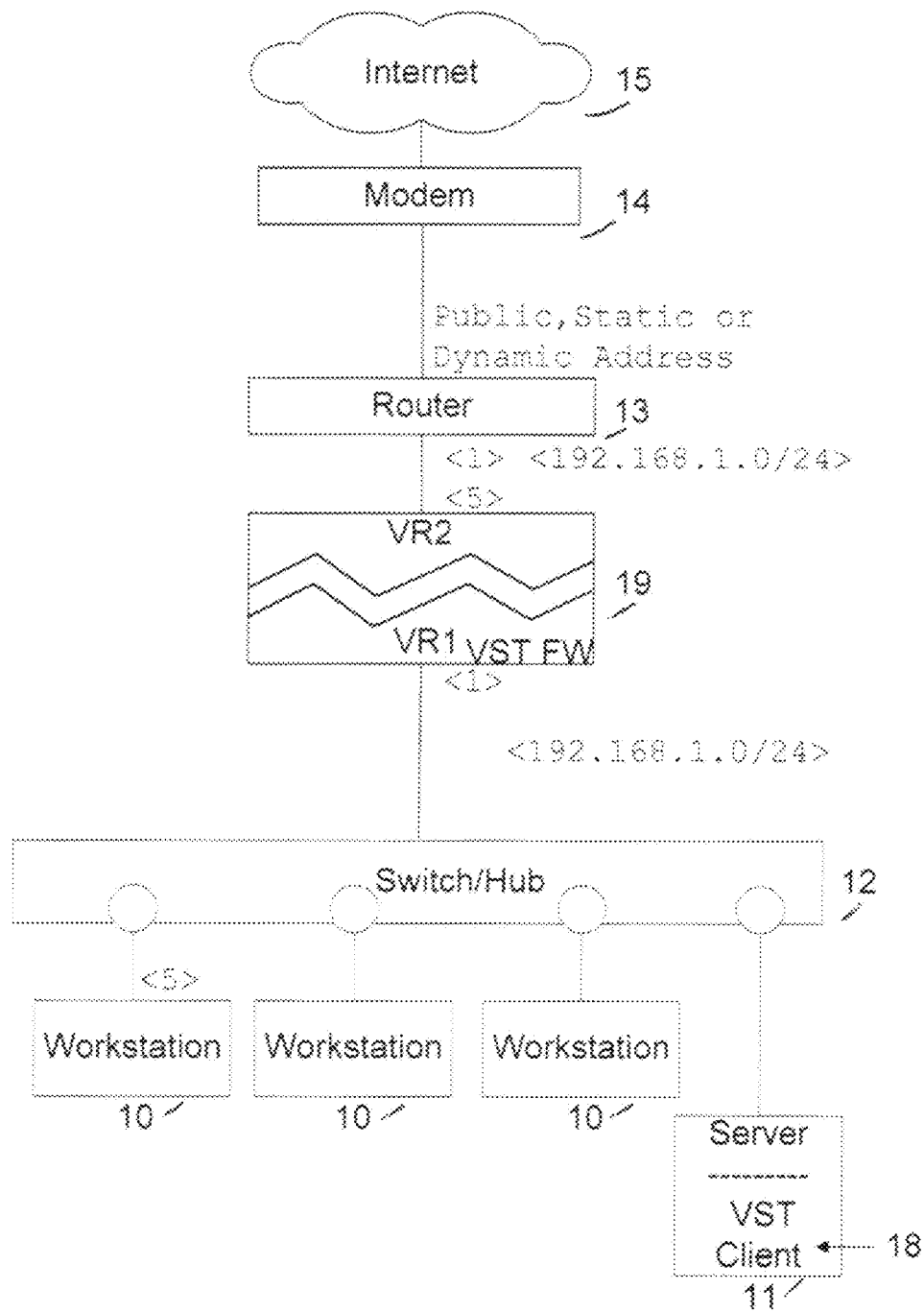

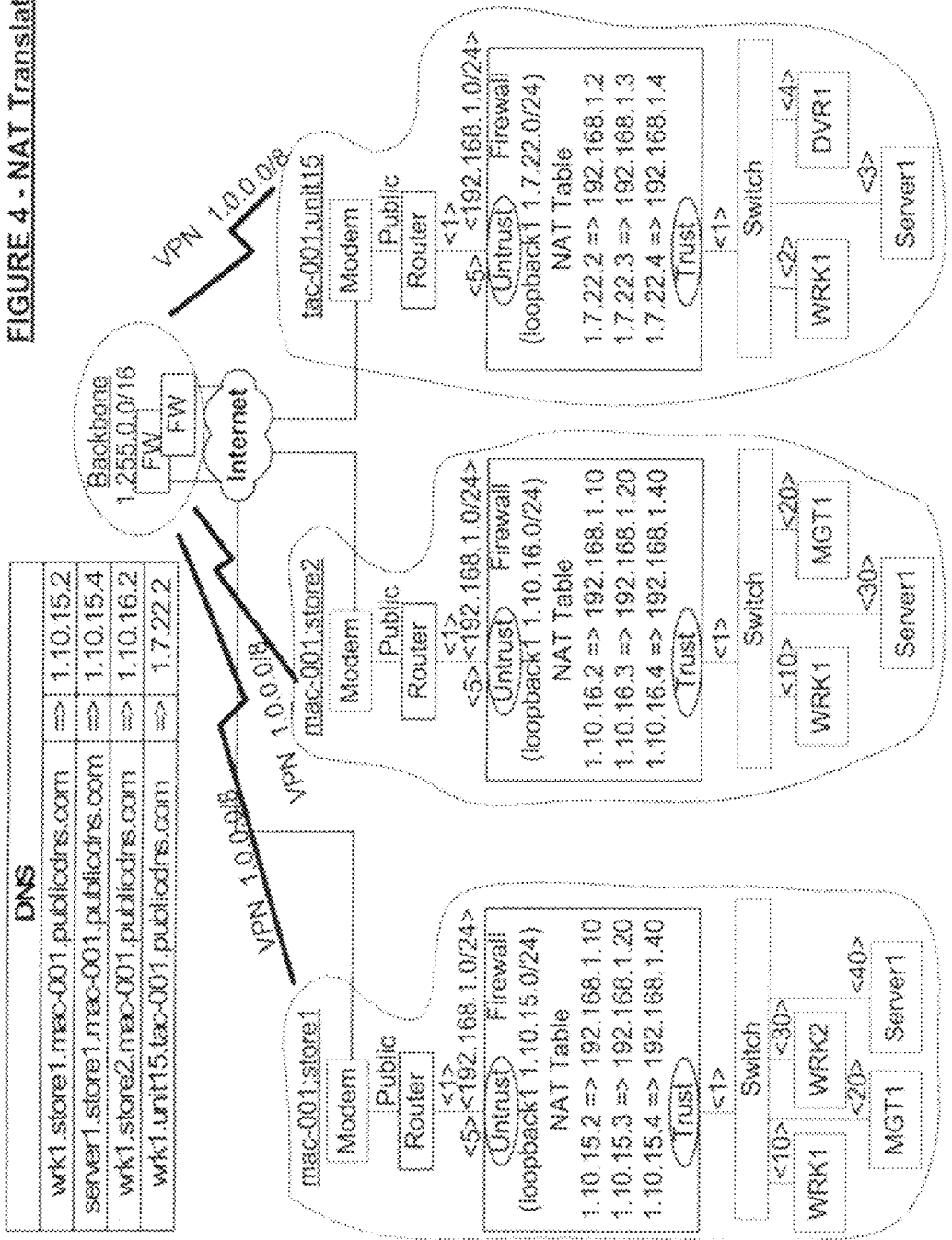

FIGURE 5: VST CLIENT COMMAND PROCESSING SEQUENCE
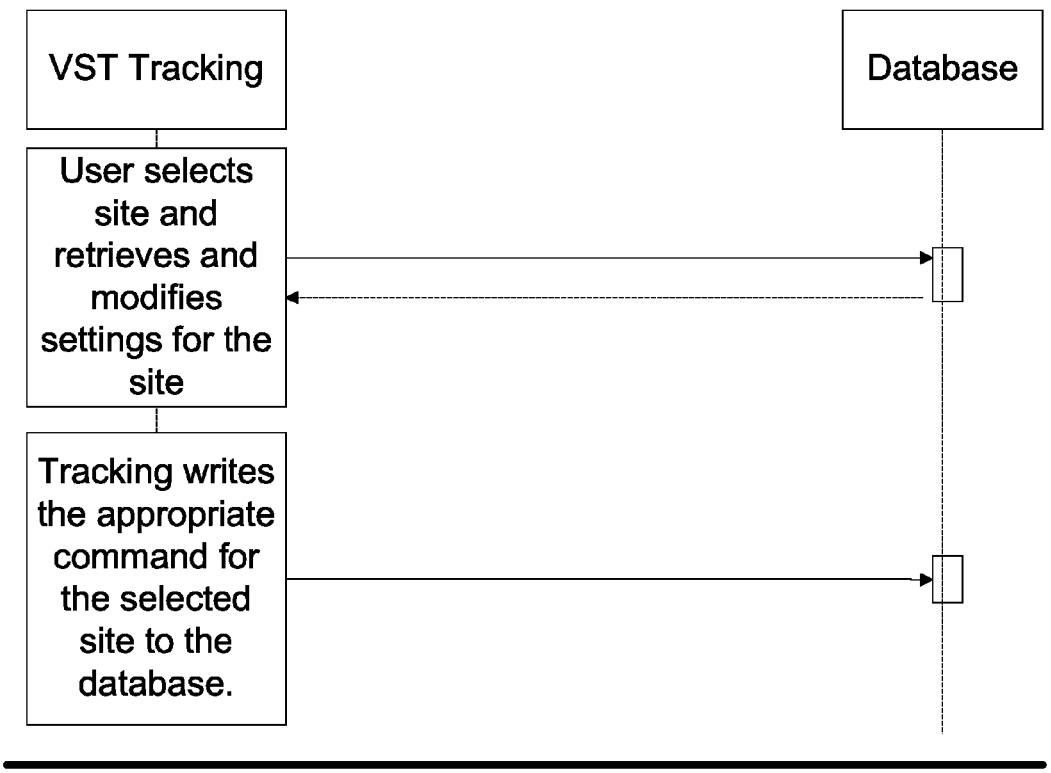
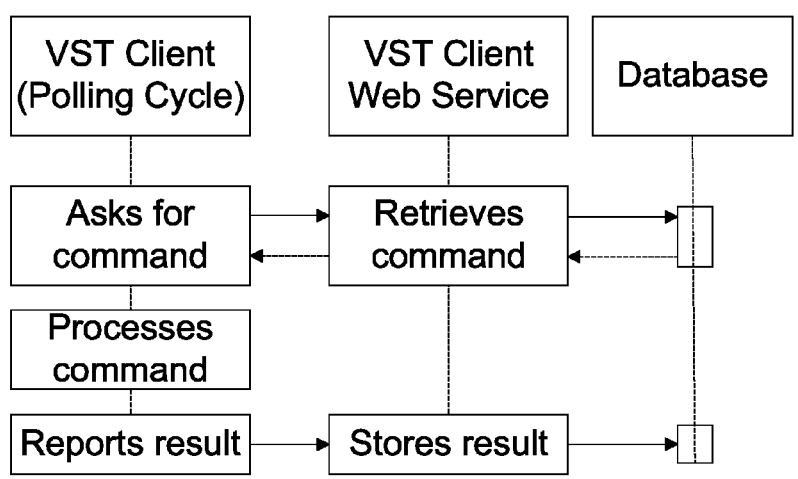

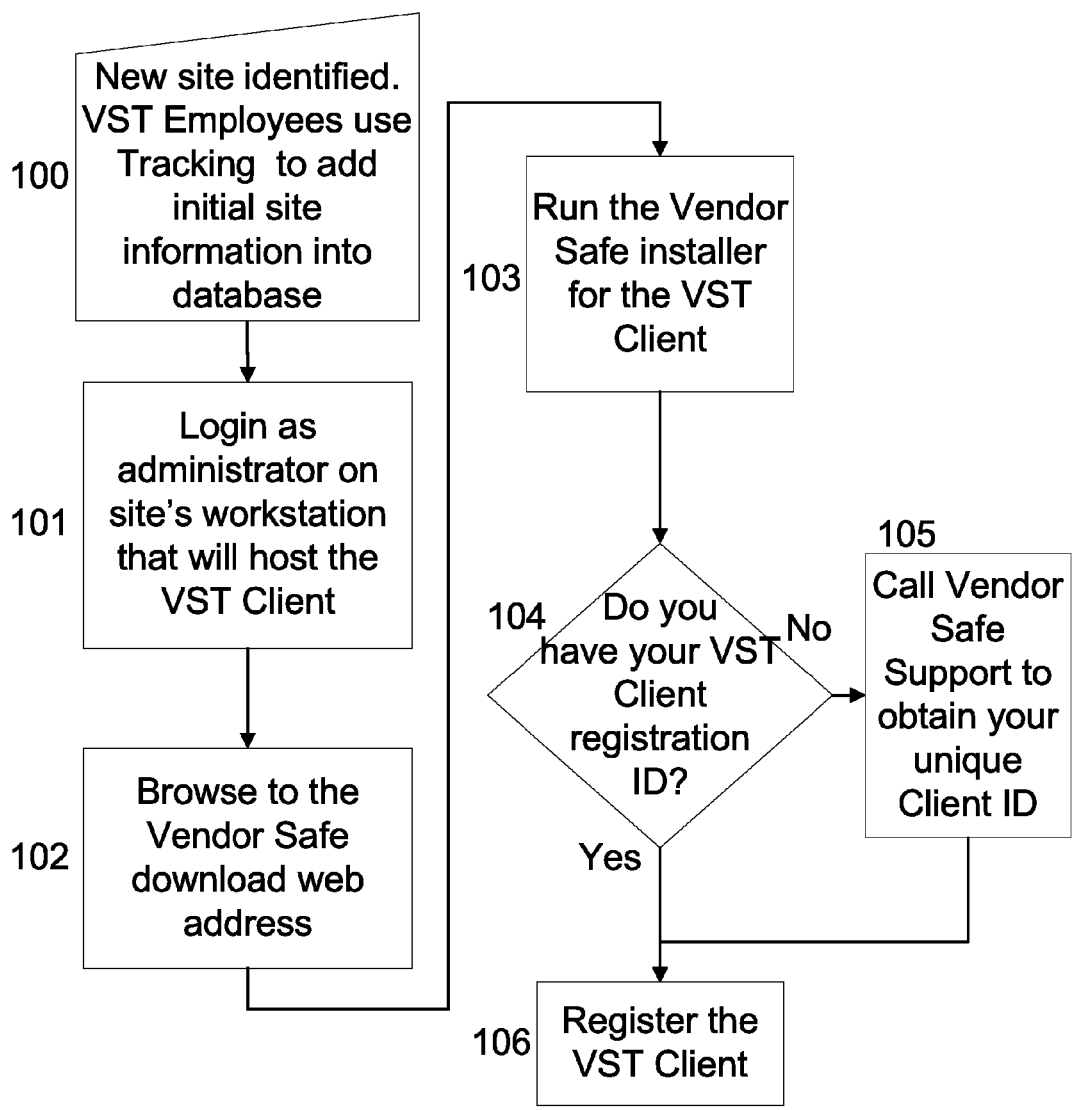
FIGURE 6: STEP 1 - INSTALL VST CLIENT

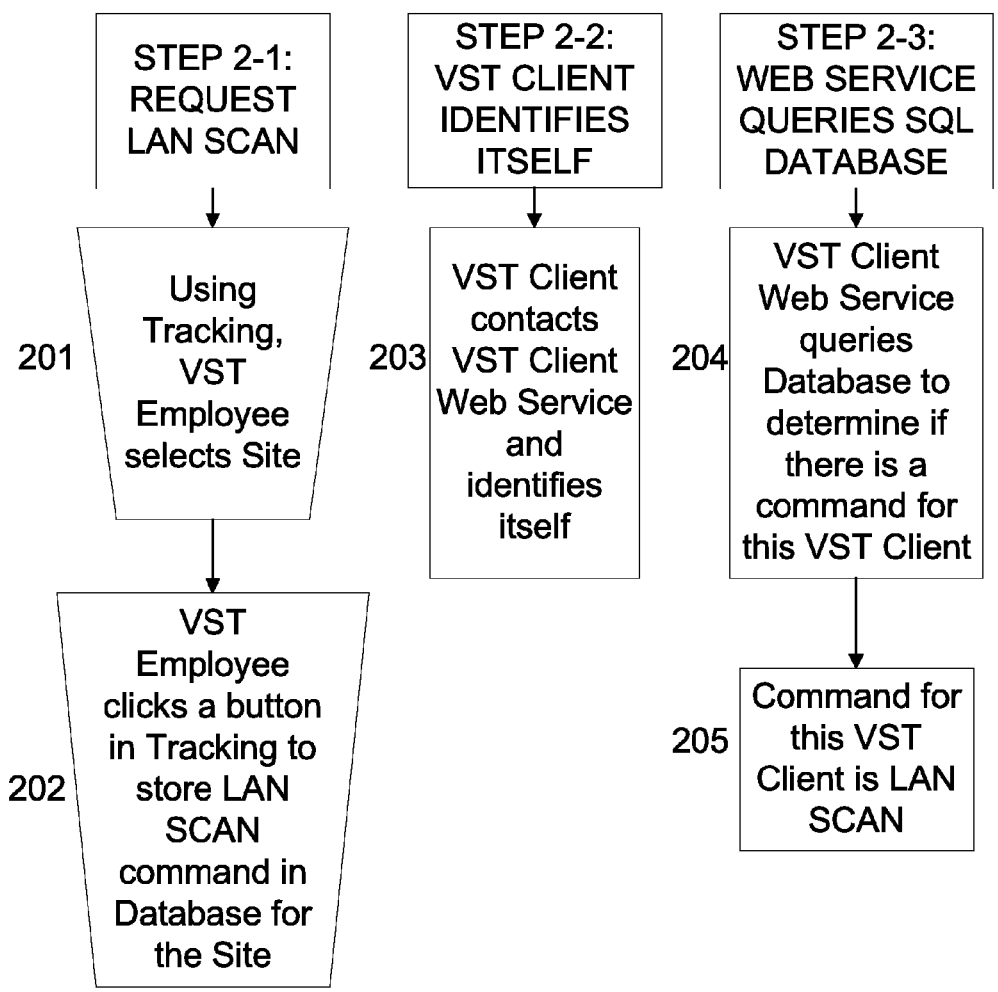
FIGURE 7: STEP 2 - LAN SCAN

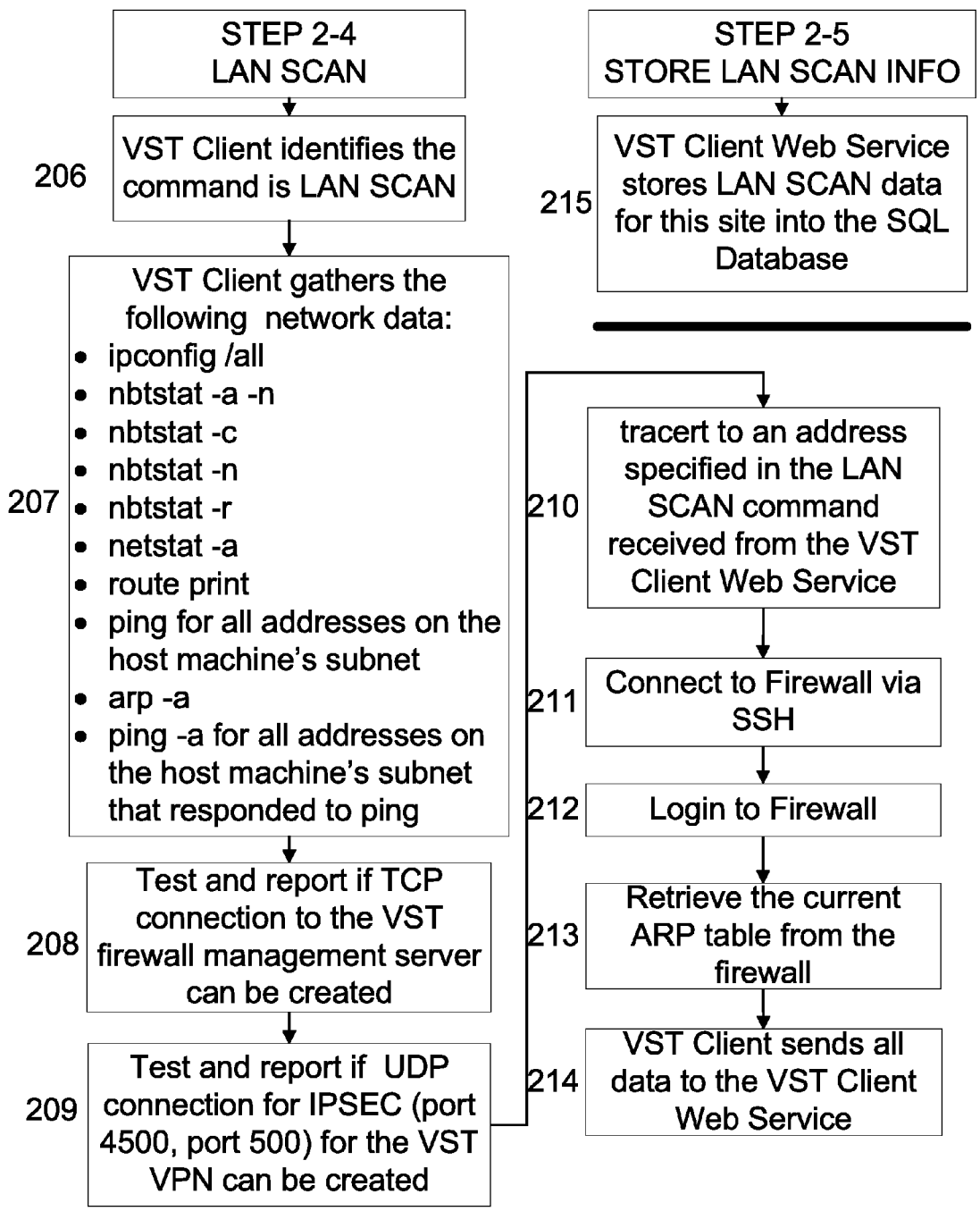
FIGURE 7: STEP 2 - LAN SCAN (Continued)

FIGURE 8: STEP 3 – FIREWALL PHYSICAL INSTALLATION
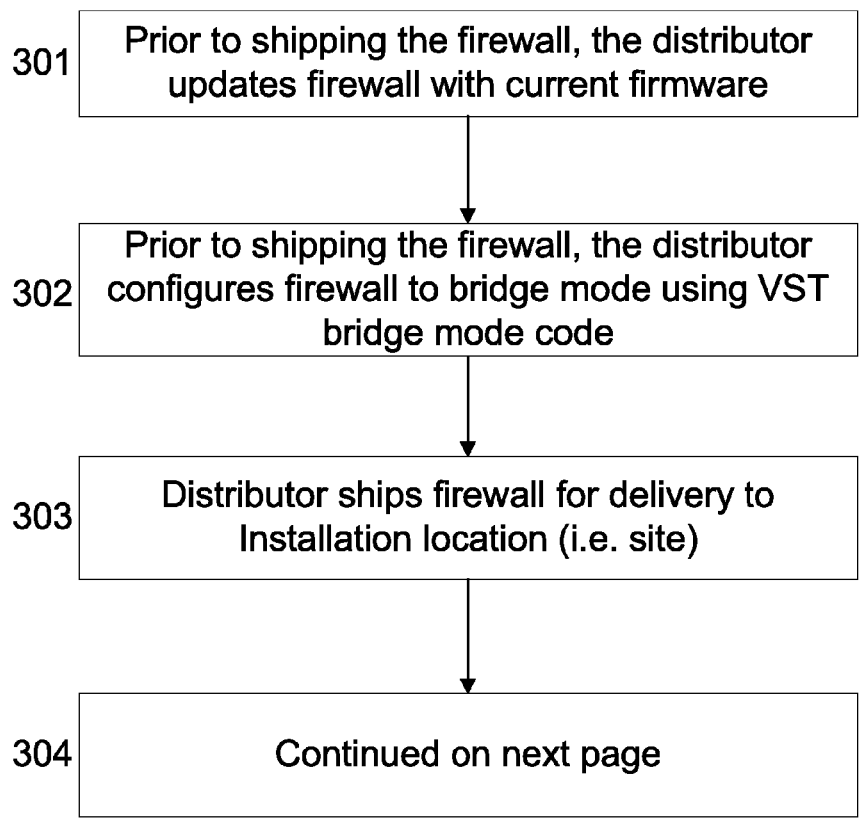

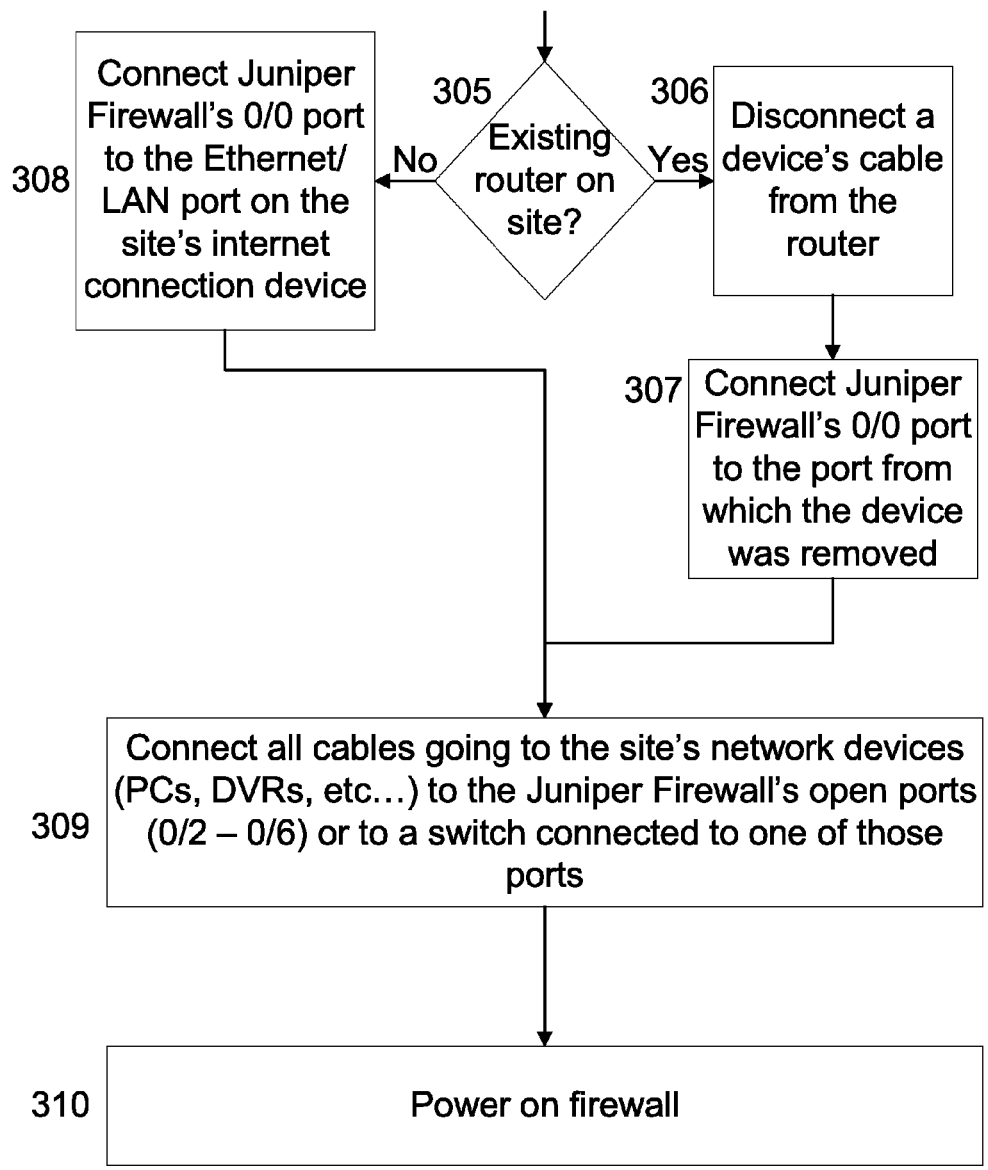

FIGURE 9: STEP 4 – FIREWALL LOGS ACTIVITIES

401 | Firewall, in bridge mode, gathers information into its logs

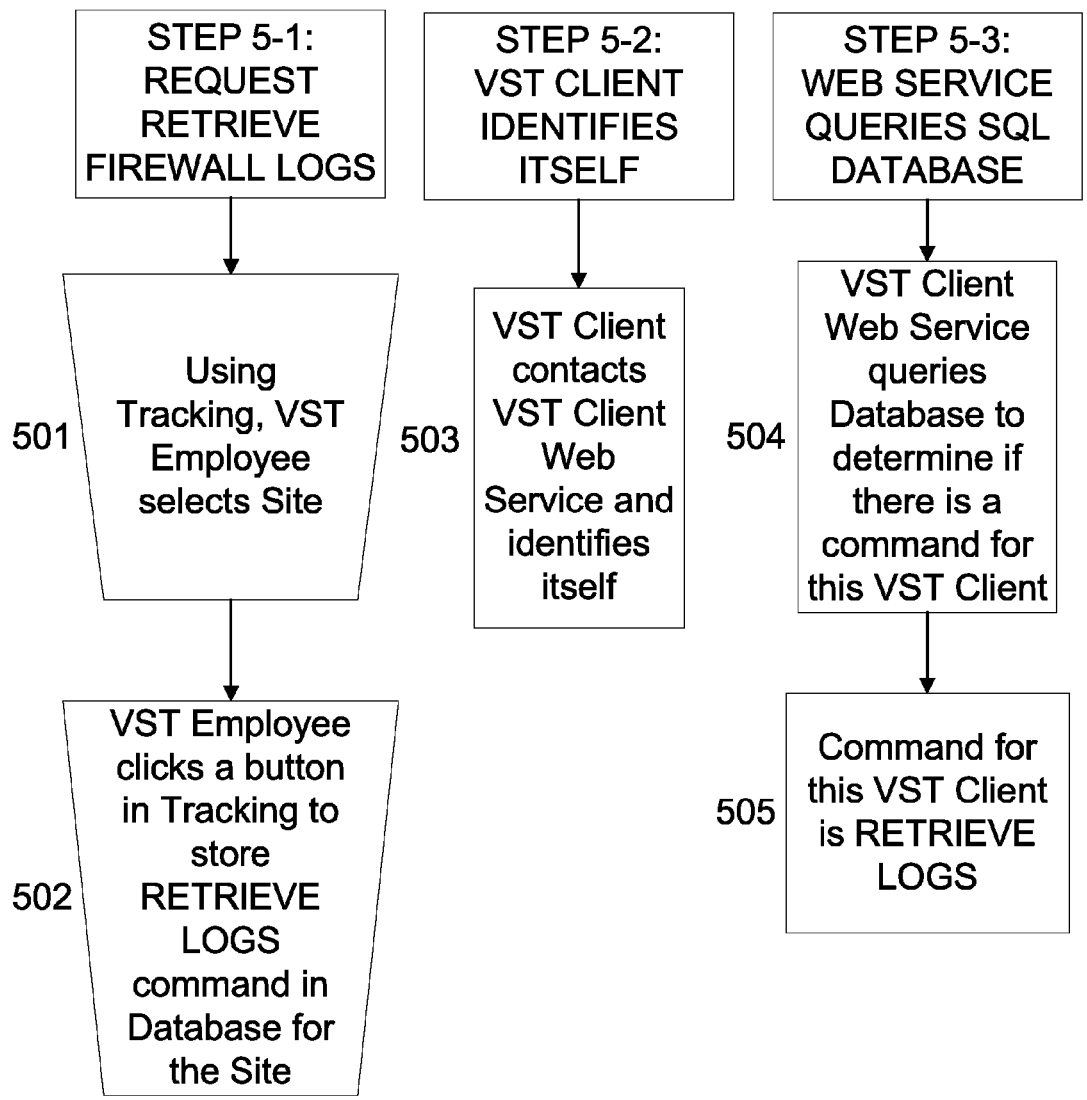
FIGURE 10: STEP 5 - RETRIEVE FIREWALL LOGS

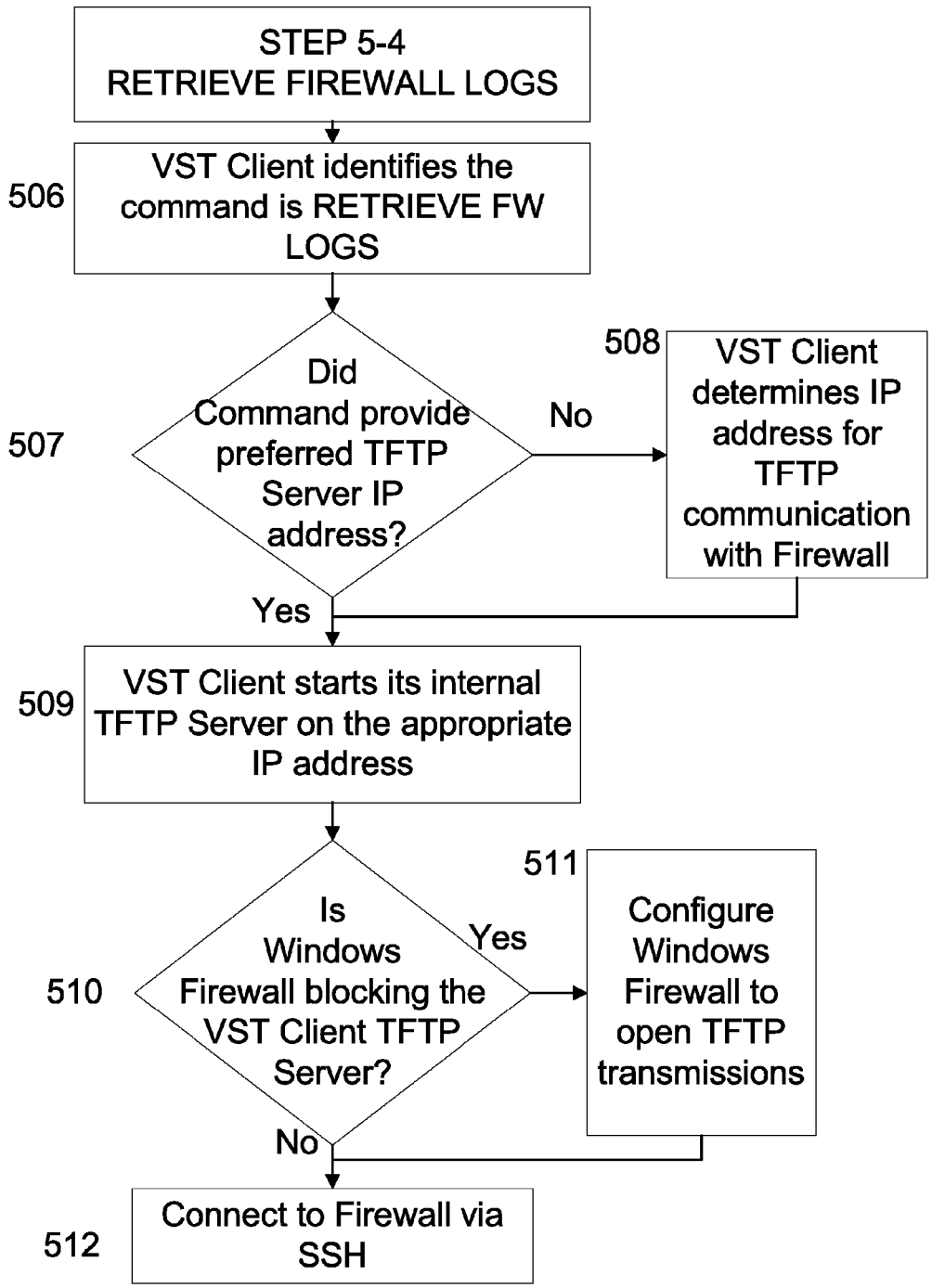
FIGURE 10: STEP 5 - RETRIEVE FIREWALL LOGS (Continued)

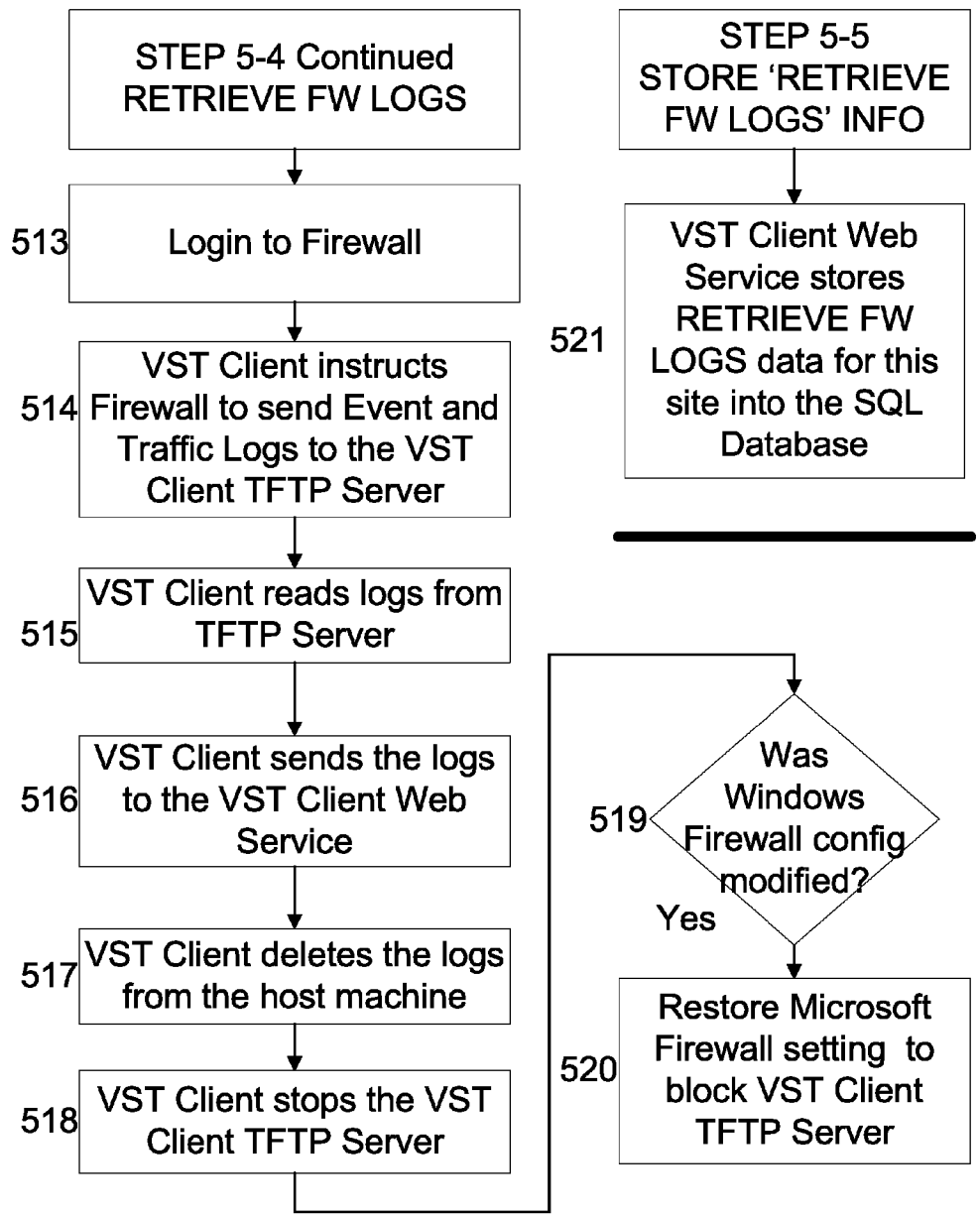
FIGURE 10: STEP 5 - RETRIEVE FIREWALL LOGS
(Continued)

FIGURE 11: STEP 6 – CREATE FIREWALL CONFIGURATION
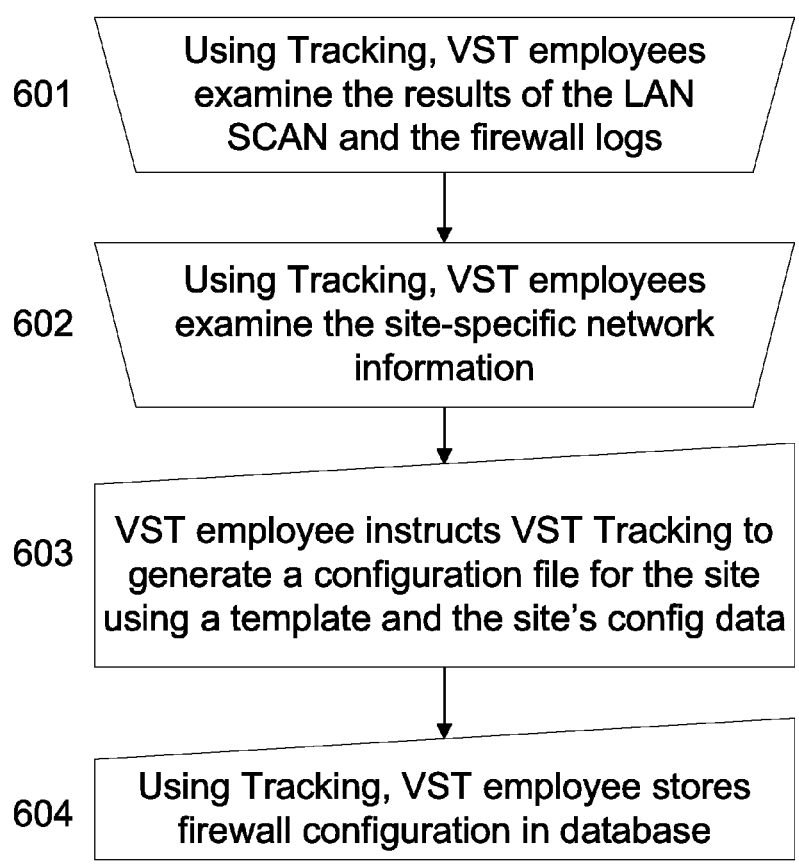

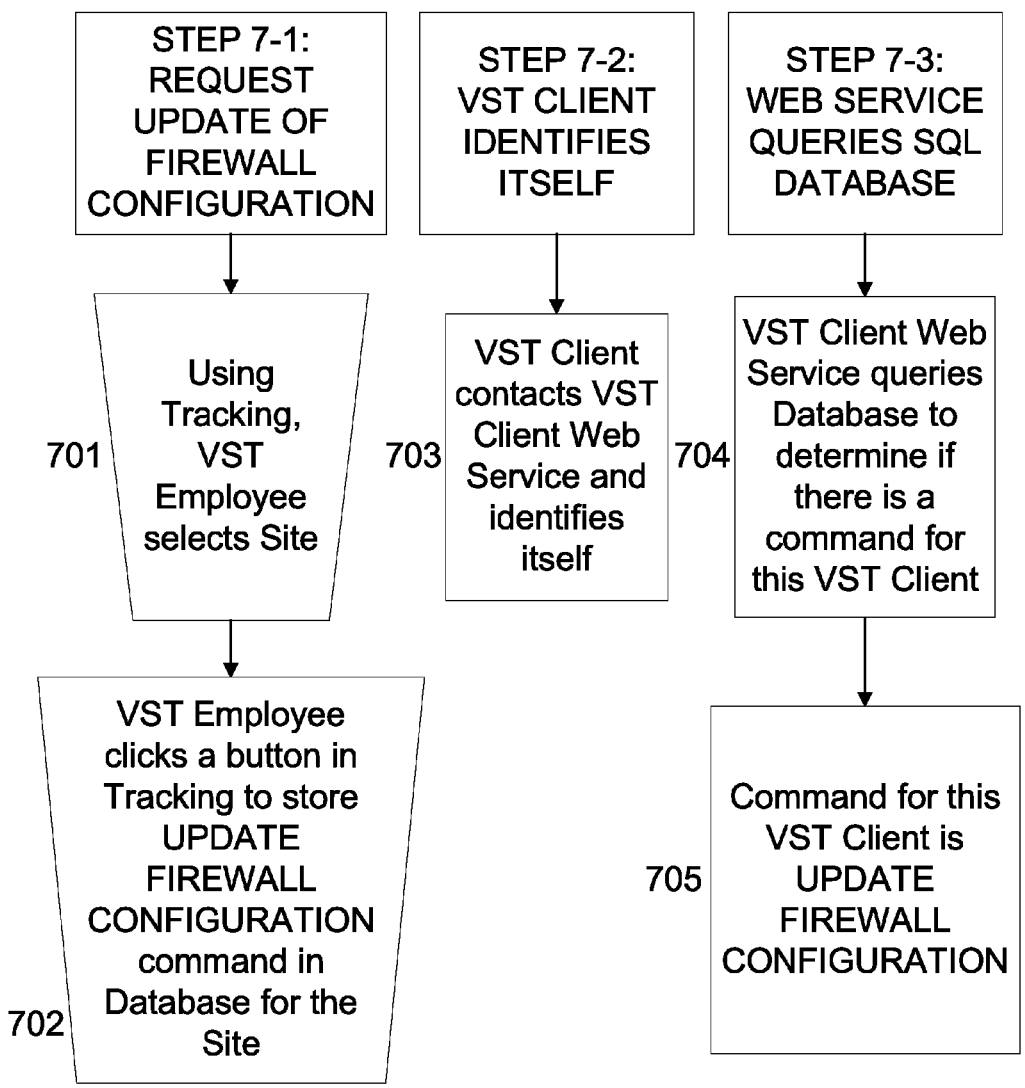
FIGURE 12: STEP 7 – CONFIGURE FIREWALL

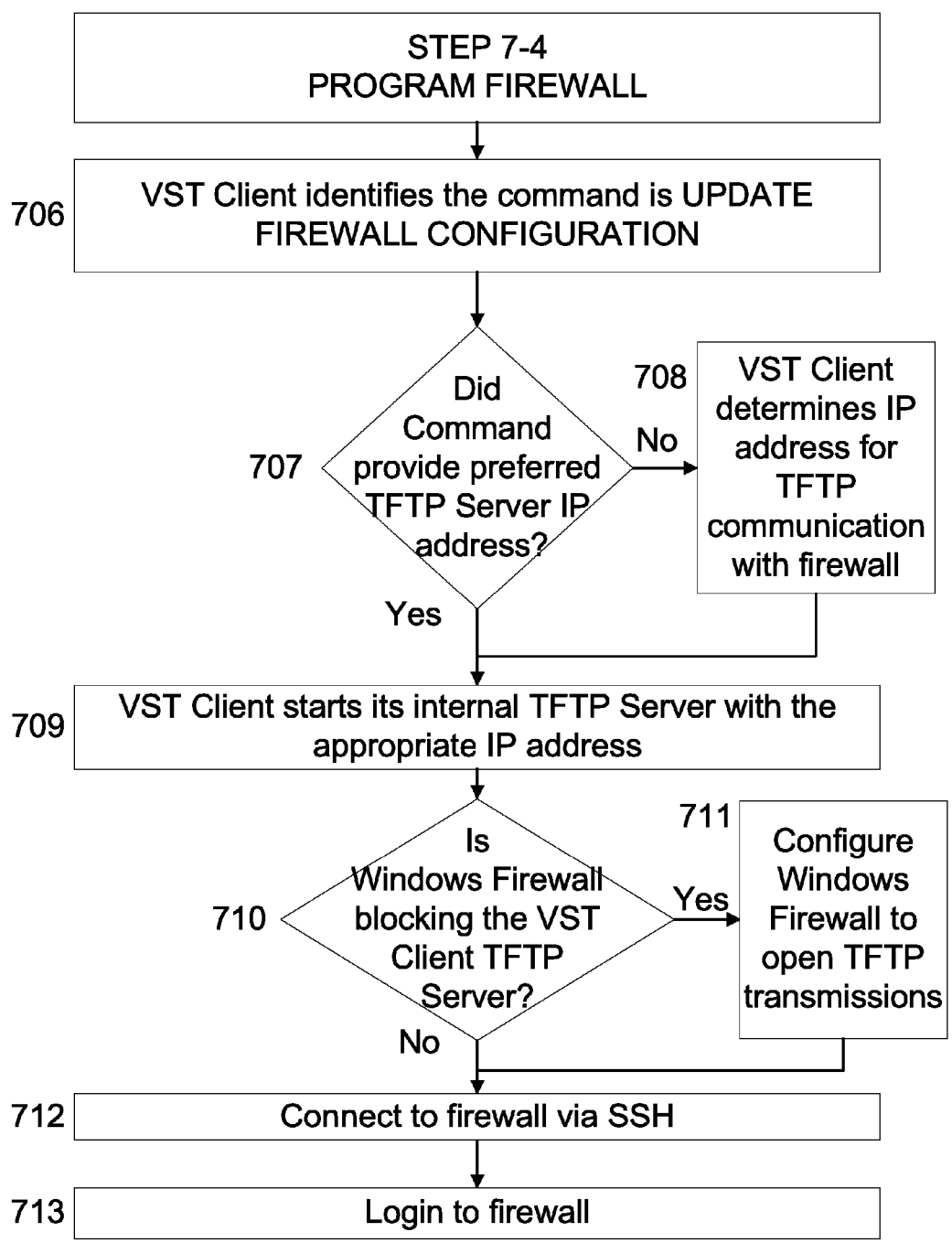
FIGURE 12: STEP 7 – CONFIGURE FIREWALL
(Continued)

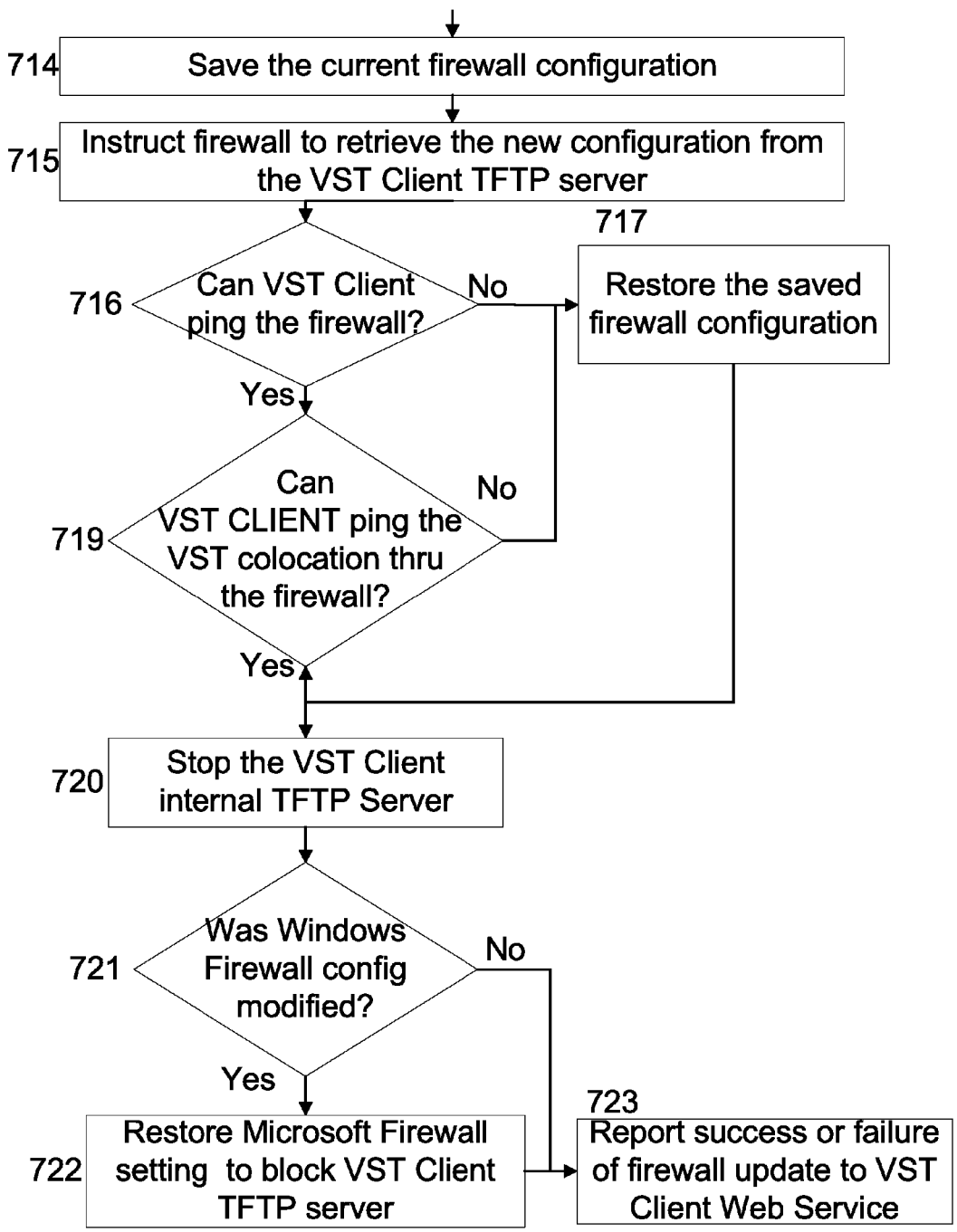

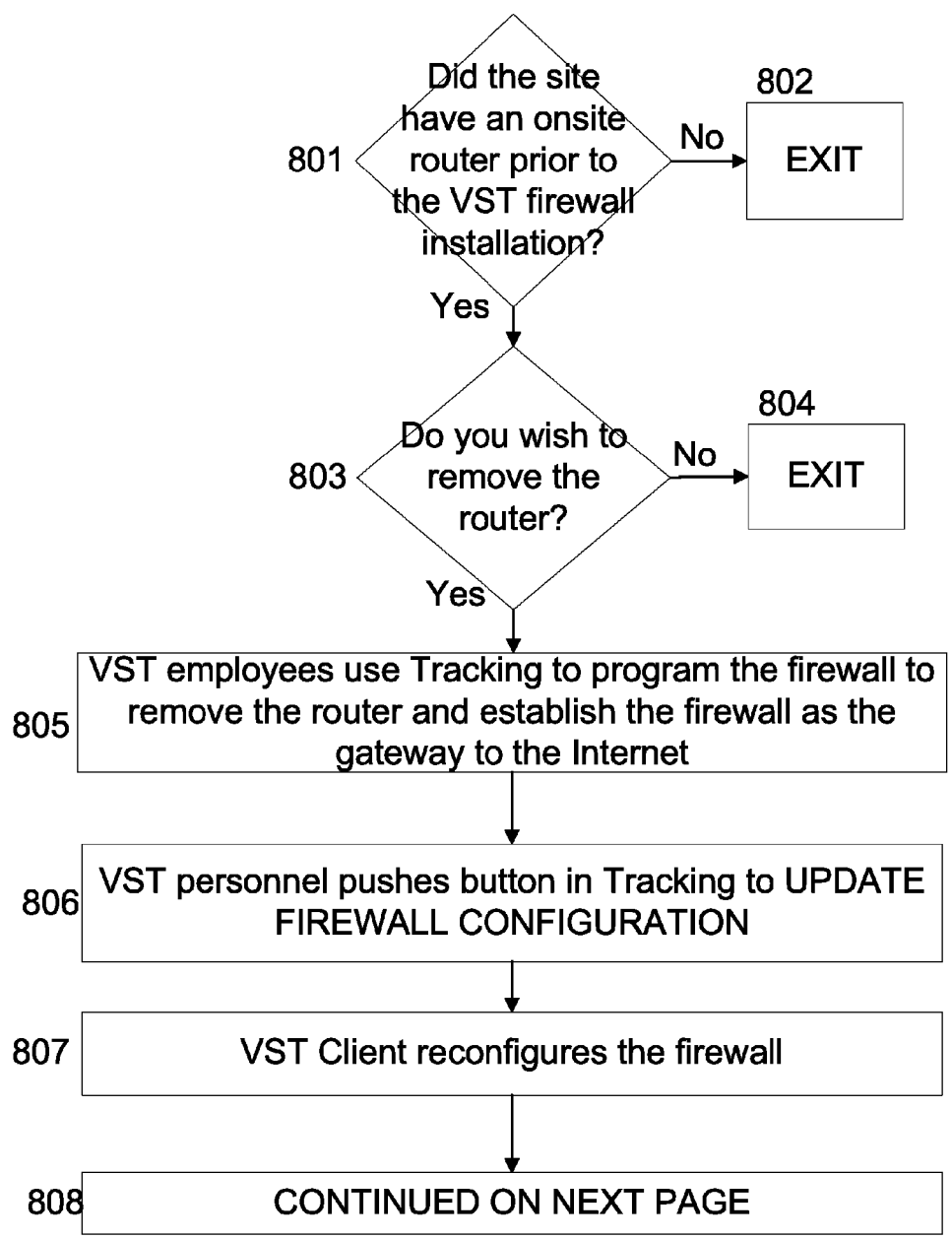
FIGURE 13: STEP 8 (OPTIONAL) REMOVE ROUTER

FIGURE 13: STEP 8 (OPTIONAL) REMOVE ROUTER
Continued
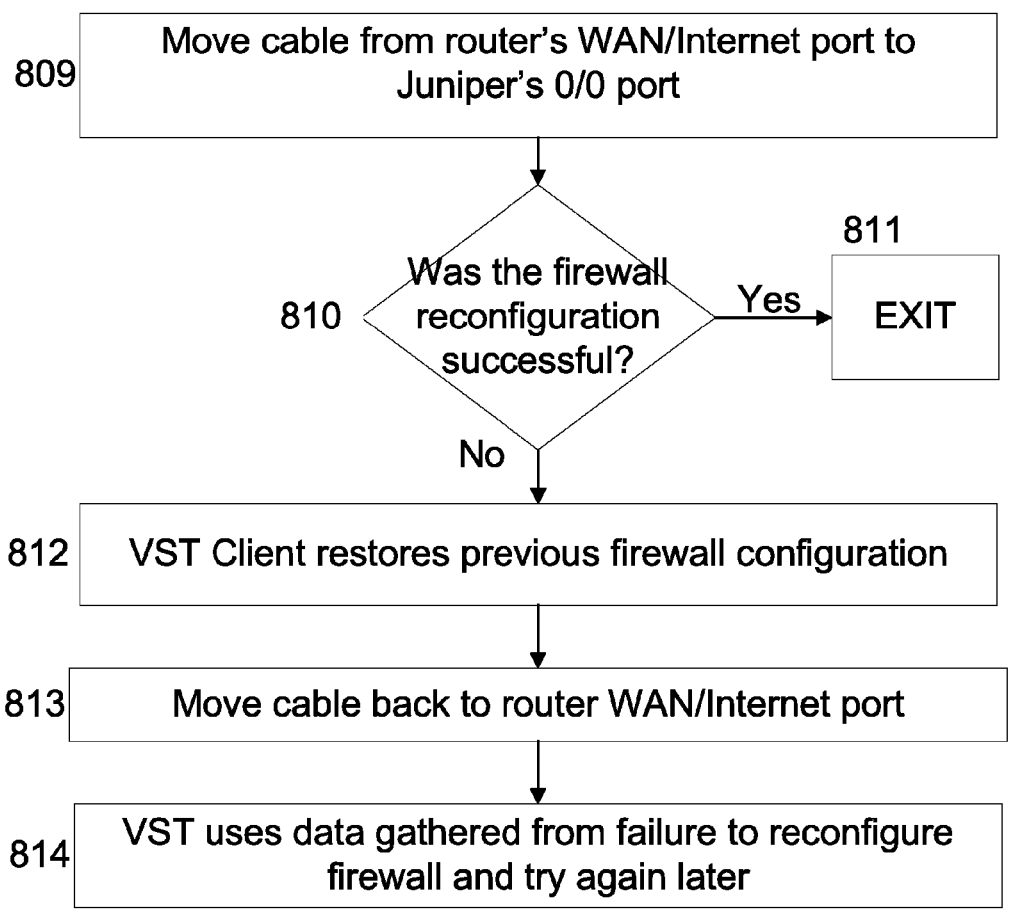

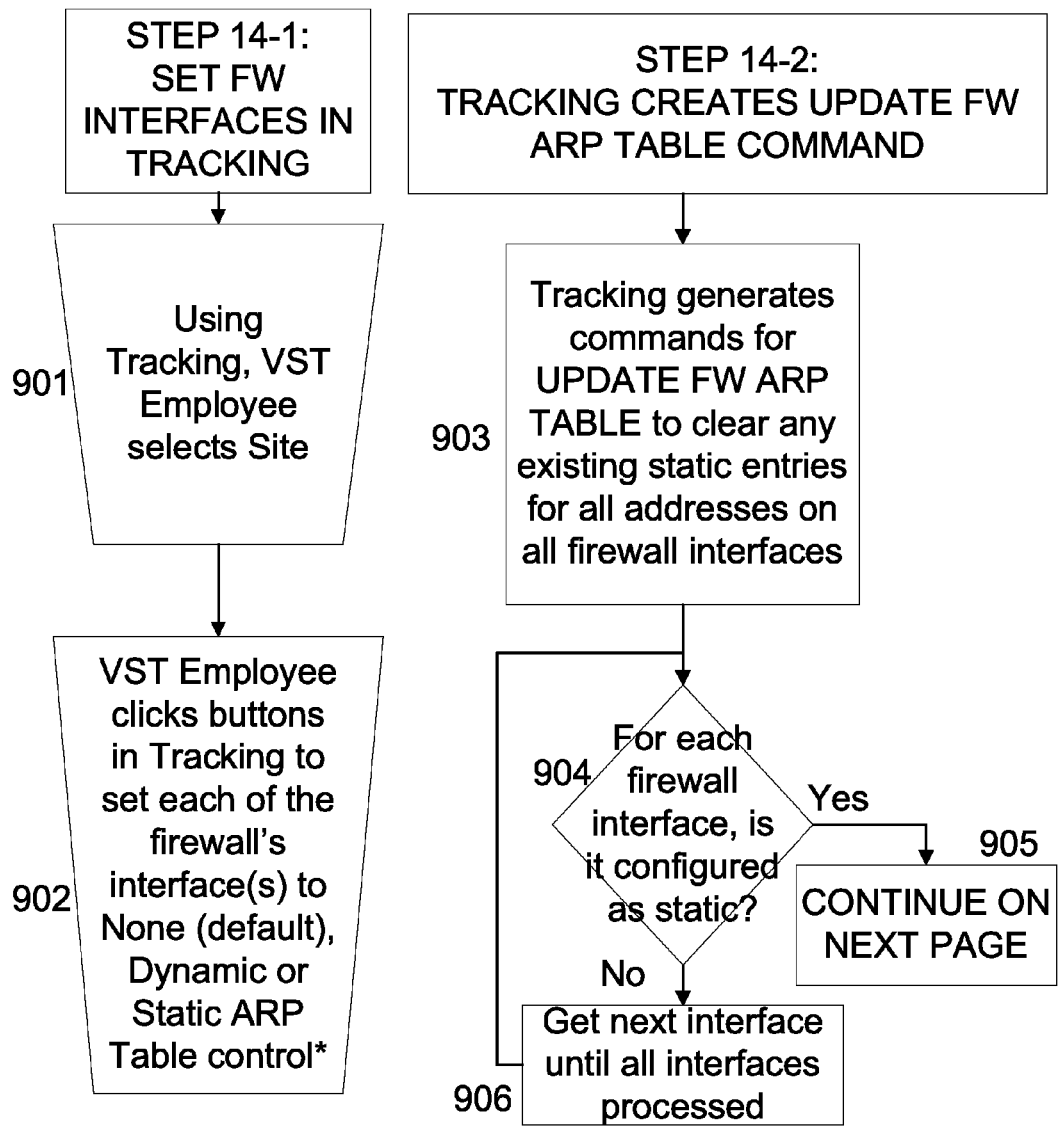
FIGURE 14: ROGUE DEVICE MANAGEMENT
\* Setting an interface to Dynamic (Rogue Device Detection) or Static (Rogue Device Prevention) ARP Table control enables Rogue Device Management on that interface

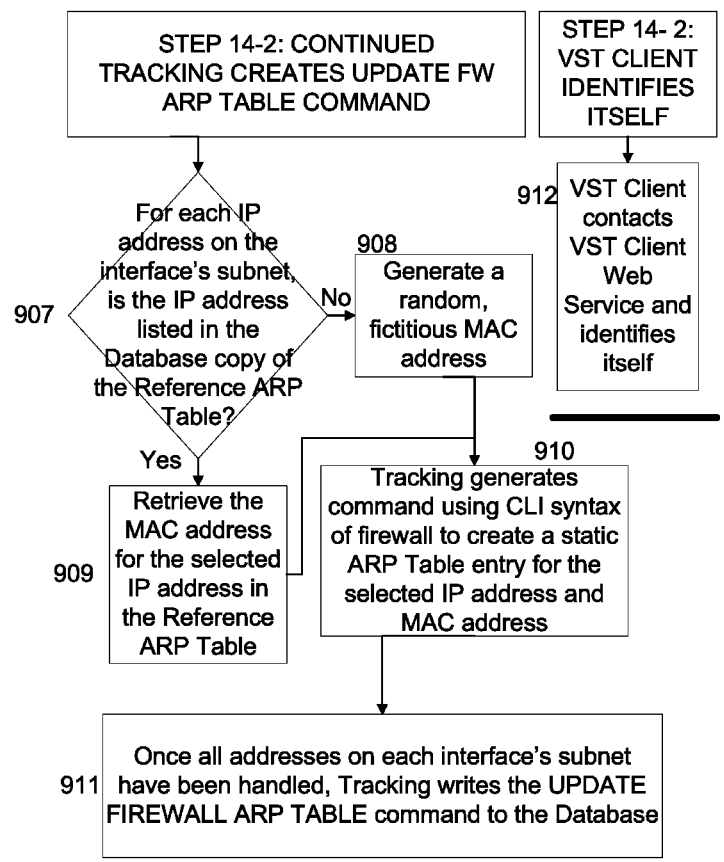
FIGURE 14: ROGUE DEVICE MANAGEMENT (Continued)

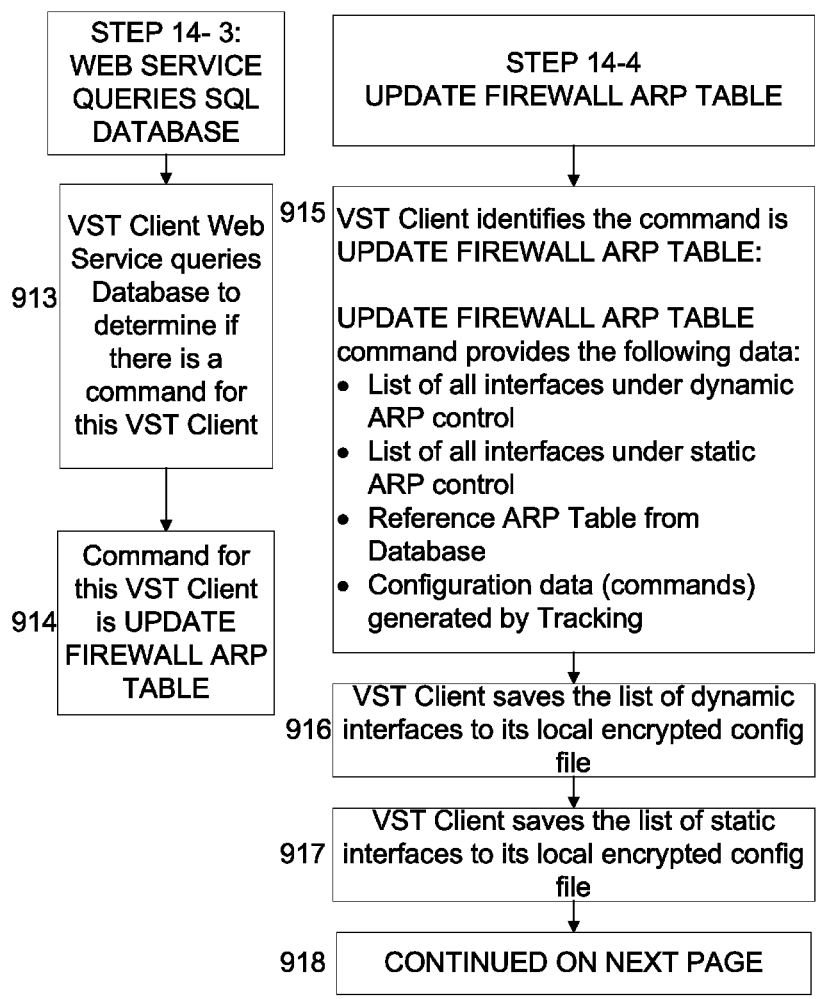
FIGURE 14: ROGUE DEVICE MANAGEMENT (Continued)

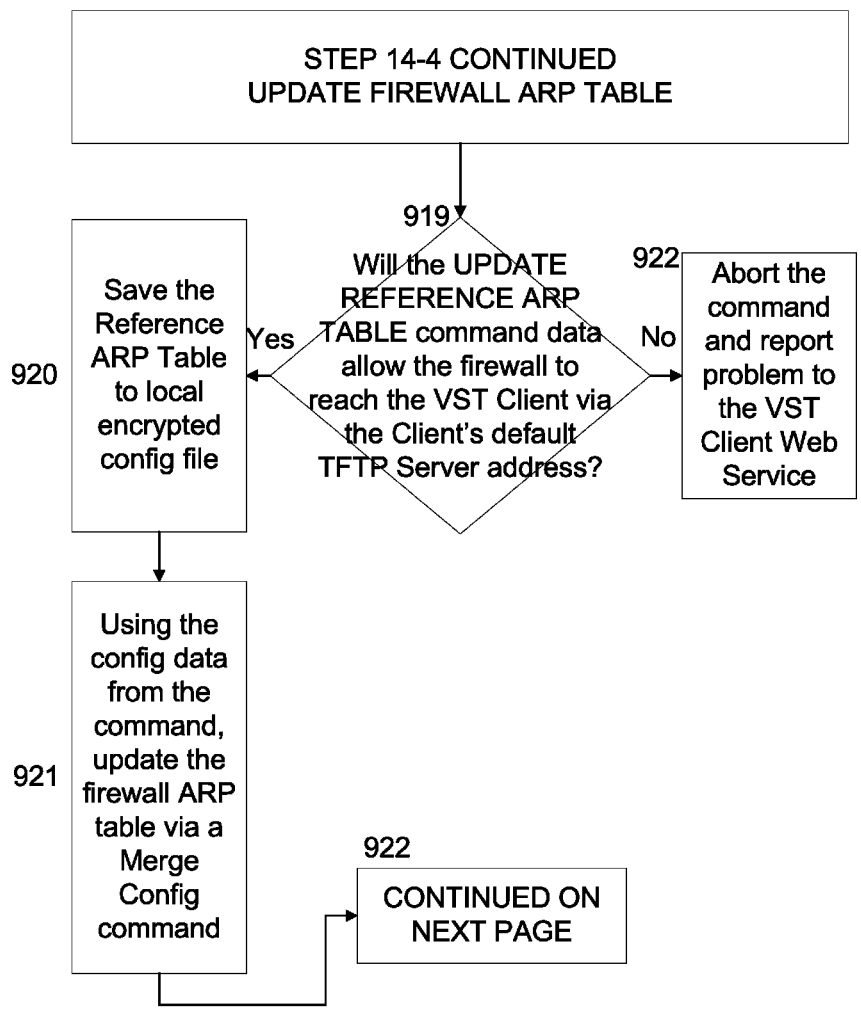

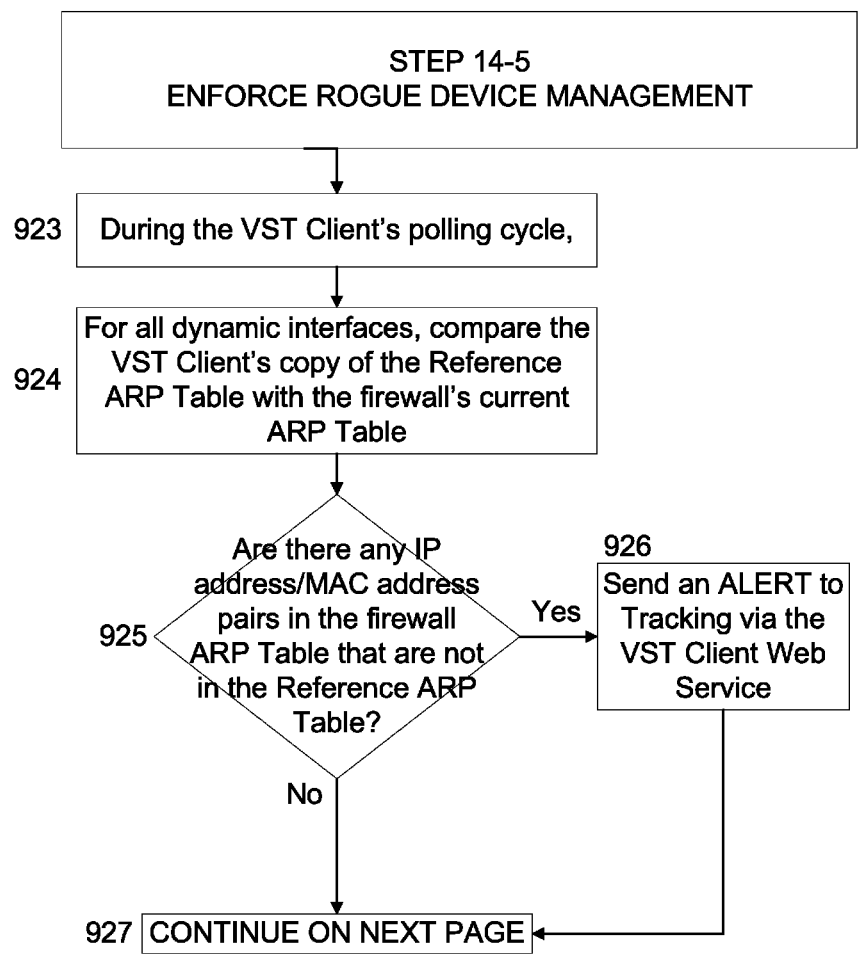
FIGURE 14: ROGUE DEVICE MANAGEMENT
(Continued)

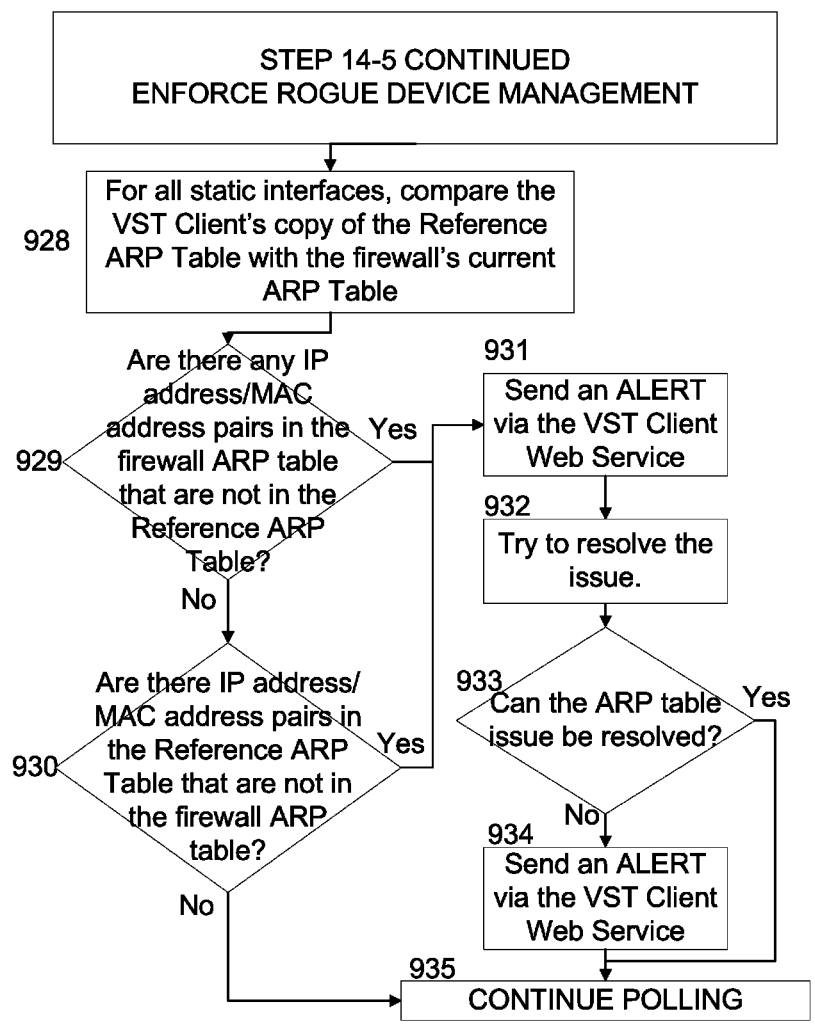
FIGURE 14: ROGUE DEVICE MANAGEMENT
(Continued)

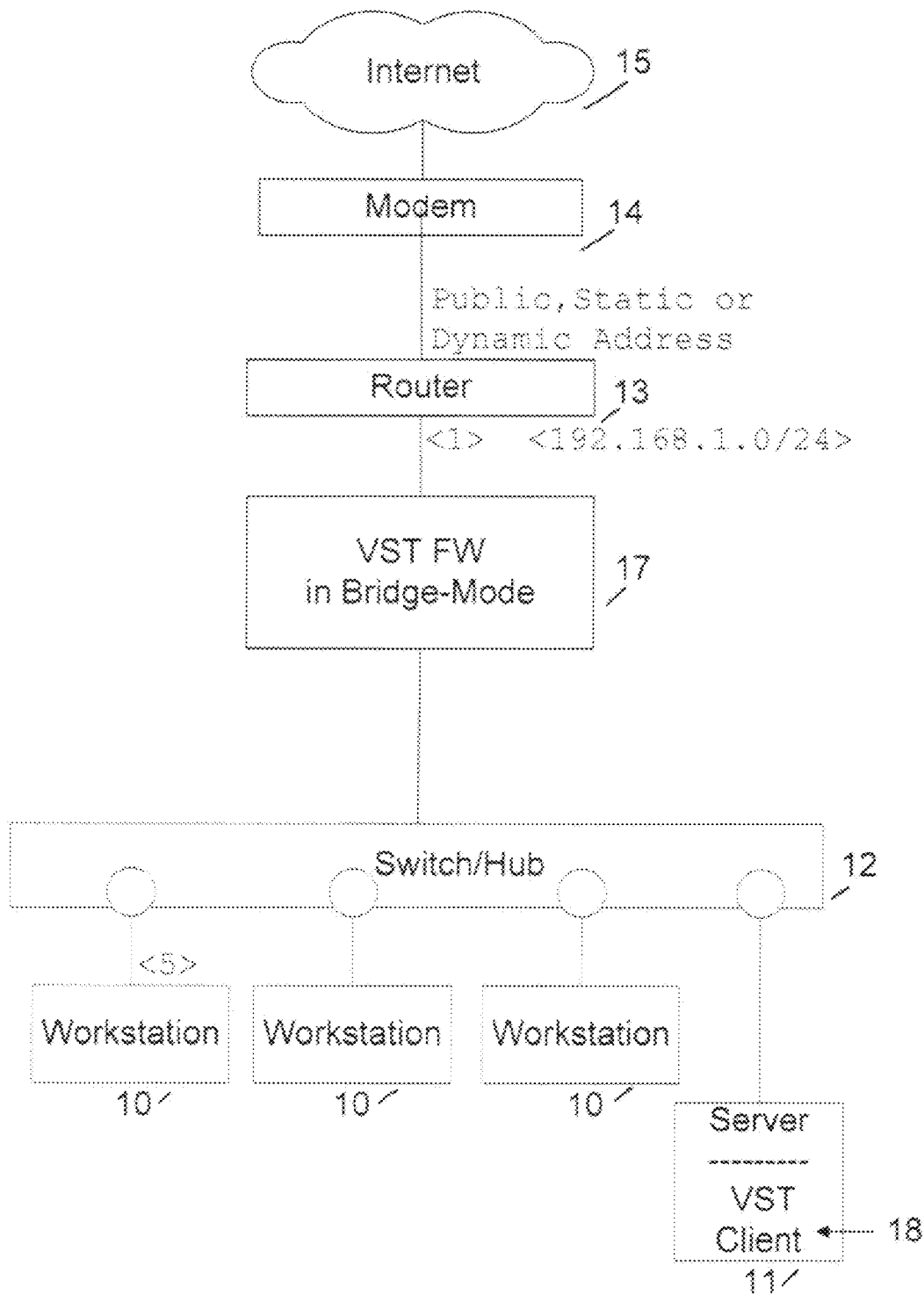

FIGURE 16 - FIREWALL CODE TO CONFIGURE FIREWALL TO BRIDGE MODE

```
set clock timezone 0
set vrouter trust-vr sharable
set vrouter "untrust-vr"
exit
set vrouter "trust-vr"
unset auto-route-export
exit
set auth-server "Local" id 0
set auth-server "Local" server-name "Local"
set auth default auth server "Local"
set auth radius accounting port 1646
set admin name "netscreen"
set admin password "nKVUM2rwMUzPcrkG5sWIHdCtqkAibn"
set admin auth timeout 10
set admin auth server "Local"
set admin format dos
set zone "Trust" vrouter "trust-vr"
set zone "Untrust" vrouter "trust-vr"
set zone "DMZ" vrouter "trust-vr"
set zone "VLAN" vrouter "trust-vr"
set zone "Untrust-Tun" vrouter "trust-vr"
set zone "Trust" tcp-rst
set zone "Untrust" block
unset zone "Untrust" tcp-rst
set zone "DMZ" tcp-rst
set zone "VLAN" block
unset zone "VLAN" tcp-rst
```

FIGURE 16 - FIREWALL CODE TO CONFIGURE FIREWALL TO BRIDGE MODE (Continued)

```
set zone "Untrust" screen tear-drop
set zone "Untrust" screen syn-flood
set zone "Untrust" screen ping-death
set zone "Untrust" screen ip-filter-src
set zone "Untrust" screen land
set zone "V1-Untrust" screen tear-drop
set zone "V1-Untrust" screen syn-flood
set zone "V1-Untrust" screen ping-death
set zone "V1-Untrust" screen ip-filter-src
set zone "V1-Untrust" screen land
set interface "ethernet0/0" zone "V1-Untrust"
set interface "ethernet0/1" zone "Null"
set interface "wireless0/0" zone "Null"
set interface "bgroup0" zone "V1-Trust"
set interface bgroup0 port ethernet0/2
set interface bgroup0 port ethernet0/3
set interface bgroup0 port ethernet0/4
set interface bgroup0 port ethernet0/5
set interface bgroup0 port ethernet0/6
set interface vlan1 ip 1.0.0.1/30
unset interface vlan1 bypass-others-ipsec
unset interface vlan1 bypass-non-ip
set interface vlan1 ip manageable
set interface "serial0/0" modem settings "USR" init "AT&F"
set interface "serial0/0" modem settings "USR" active
set interface "serial0/0" modem speed 115200
set interface "serial0/0" modem retry 3
set interface "serial0/0" modem interval 10
set interface "serial0/0" modem idle-time 10
```

FIGURE 16 - FIREWALL CODE TO CONFIGURE FIREWALL TO BRIDGE MODE (Continued)

```
unset flow tcp-mss
unset flow tcp-syn-check
set console timeout 30
set console page 0
set pki authority default scep mode "auto"
set pki x509 default cert-path partial
set ike respond-bad-spi 1
unset ike ikeid-enumeration
unset ike dos-protection
unset ipsec access-session enable
set ipsec access-session maximum 5000
set ipsec access-session upper-threshold 0
set ipsec access-session lower-threshold 0
set ipsec access-session dead-p2-sa-timeout 0
unset ipsec access-session log-error
unset ipsec access-session info-exch-connected
unset ipsec access-session use-error-log
exit
set policy id 1 from "V1-Trust" to "V1-Untrust"  "Any" "Any" "ANY"
    permit log
set policy id 1
exit
set policy id 2 from "V1-Untrust" to "V1-Trust"  "Any" "Any" "ANY"
    permit log
set policy id 2
exit
```

FIGURE 16 - FIREWALL CODE TO CONFIGURE FIREWALL TO BRIDGE MODE (Continued)

```
set ssh version v2
set ssh enable
set config lock timeout 5
set wlan 0 channel auto
set wlan 1 channel auto
set snmp port listen 161
set snmp port trap 162
set vrouter "untrust-vr"
exit
set vrouter "trust-vr"
unset add-default-route
set route 0.0.0.0/0 interface vlan1
exit
set vrouter "untrust-vr"
exit
set vrouter "trust-vr"
exit
```

METHOD FOR DEPLOYING A FIREWALL AND VIRTUAL PRIVATE NETWORK TO A COMPUTER NETWORK

BACKGROUND OF INVENTION

1. Field of the Invention

This invention relates to the security of local networks; for example, in business establishments. Unauthorized access often results in theft of critical data, such as credit card information, personal identification information, business proprietary information and the like. There are many approaches to securing small- to middle-size business networks. However, these approaches often require on-site visits by computer technicians, result in network downtime for periods of time that are detrimental to the business, and are difficult to complete if any step of the installation fails. The present invention is a method and system for remotely securing a network from unauthorized access, and simultaneously creating a virtual private network (VPN) structure, with minimal human intervention at the business establishment allowing for a highly secure, highly scalable solution.

2. Description of Related Art

Known methods of securing a small- to medium-size business via a VPN require that each device at every site on the VPN have a unique Internet Protocol (IP) subnet address. Since sites may have been installed at different times and by different technical staff, most will have been numbered in an arbitrary manner. Re-organizing each site entails renumbering the IP addresses for most, if not all, of the hosts. Changing the end user IP addresses can be expensive to perform, requires the dispatch of at least one highly skilled technical individual to the site, is error prone, can paralyze the end user's system (thus stopping the processing of transactions during the diagnosis and correction of the installation problems), and may require multiple efforts to be successful.

Generally, technical staff are sent to gather information about the devices at a given site. In many cases, it is not possible to set up a firewall with a single site visit because of the myriad devices the technician encounters, some of which may require other vendors for re-programming. If the technician is unable install the firewall during the initial site visit, the information gathered by the technician is used to program an off-site firewall which is then sent to the site for installation by someone at the site.

This process can take significantly more time to perform a firewall installation than the present invention requires, and it may be necessary to shut down the site for an extended period of time, wait for a lull in the site's transaction processing, or possibly require skilled technical personnel to perform the installation overnight. These issues reduce the number of sites that can be set up in a day.

Furthermore, many current methods require that the end-user site use static IP addresses for Internet access so that the firewall may be managed remotely. An Internet connection with a static IP address is significantly more expensive than the dynamic IP addresses allowed by the present invention's method.

Also, current methods may need to alter the Internet router's programming to allow remote access to the firewall from the Internet for programming and maintenance.

Current methods used to prevent unauthorized devices from accessing the Internet or VPN typically use additional hardware, such as a managed layer-2 switch, to ensure only authorized IPs with known Media Access Control (MAC) addresses can communicate on the network. Additional hardware adds cost and labor. Not only does additional hardware incur a cost, but also the maintenance of that additional hardware generates an ongoing support cost. This approach entails additional hardware and labor costs at each site. In addition, there are incremental labor costs associated with managing the device remotely.

Current processes are labor intensive, require network downtime for periods of time that are detrimental to the business, and are prone to installation errors that require the technicians to return the network to its original condition so that it is operational for business, and then start over. Furthermore, firewalls used for security purposes are typically shipped at least twice; first, from the manufacturer to the vendor for customization and, second, from the vendor to the site for installation. If customization errors occur, in addition to rendering the local network inoperative, the firewall may need to be shipped a third time, back to the vendor for correction, and then a fourth time, back to the site for another installation attempt.

BRIEF SUMMARY OF THE INVENTION

The present invention addresses all the above-mentioned drawbacks in the prior art. The present invention enables the installation of a network security system without the need for on-site visits by technicians and can be implemented remotely. In order to accomplish remote installation, several unique techniques have been developed as will be apparent in the following detailed description of the invention. Briefly, in order to achieve remote installation, the following hurdles needed to be overcome. First, it would not be feasible to have employees at the business site renumber the Internet Protocol (IP) addresses of all the local devices on the network. Second, in the event of an installation error, the site must be capable of being restored to its pre-installation state to permit the business to continue to operate while the installation problems are diagnosed and solved. Third, remote access to the firewall may not be possible from the public Internet. Fourth, all security services, whether software or hardware, described for the invention always initiate communication back to a centralized system over unprotected networks using standard encrypted protocols such as SSL or SSH. Additionally, it is desirable to have detection or prevention of unauthorized device accesses without the cost and expense of additional hardware so that the security of the site is complete. An object of this invention is to secure a local network in a manner that does not require the IP addresses of any devices on the local network (e.g., router, workstations, servers) to be renumbered. Another object of the invention is to have the system automatically revert to its previous code by programming the firewall from the protected local area network (LAN) side, not the unprotected Internet side, if an error occurs. Further objects of the invention include securing a remote network by utilizing a person with minimal technical skill to install, and, if necessary, uninstall the solution and to minimize shipping costs by allowing the hardware device to be shipped directly from a distributor. A further object of the invention is to establish a VPN for multiple related local networks where the established VPN allows devices at different sites to have the same IP address. A further object of the invention is to allow for the site to be restored to its pre-installation state if hardware installation fails. An additional object of the invention is to secure a local network in a manner that does not require public static IP addresses to the Internet in order to manage the solution.

All of these hurdles have been overcome as explained below.

BRIEF DESCRIPTION OF THE SEVERAL VIEWS OF THE DRAWING(S)

FIG. 1 illustrates a typical business network.

FIG. 2 illustrates the network of FIG. 1 with a typical firewall installation.

FIG. 3 illustrates the network of FIG. 1 with the firewall configured in route-mode according to the invention.

FIG. 4 is a diagram of the network address translation (NAT) functions. This aspect of the invention allows the local IP addresses to remain unchanged.

FIG. 5 is a flowchart of the VST Client command processing sequence. The interaction of VST Tracking, SQL Database, VST Client Web Service and the VST Client allows for remote management and configuration of the site's local network.

FIG. 6 is a flowchart of Step 1 of the VST Firewall installation process: Installation of the VST Client software.

FIG. 7 is a flowchart of Step 2 of the VST Firewall installation process: LAN Scan.

FIG. 8 is a flowchart of Step 3 of the VST Firewall installation process: Physical installation of the firewall.

FIG. 9 is a flowchart of Step 4 of the VST Firewall installation process: Firewall logs activities.

FIG. 10 is a flowchart of Step 5 of the VST Firewall installation process: Retrieve firewall logs.

FIG. 11 is a flowchart of Step 6 of the VST Firewall installation process: Create the firewall configuration.

FIG. 12 is a flowchart of Step 7 of the VST Firewall installation process: Configure the firewall to route-mode.

FIG. 13 is a flowchart of optional Step 8 of the VST Firewall installation process: Remove router. This process further illustrates the present invention's ability to remotely manage and modify the site's configuration with minimal downtime and without onsite technical expertise.

FIG. 14 is a flowchart illustrating the setup and enforcement of the Rogue Device Detection and Rogue Device Prevention functionality that protects the network from unauthorized network access from within the site without the expense of additional hardware support.

FIG. 15 illustrates the network of FIG. 1 with the firewall configured in bridge-mode according to the invention.

FIG. 16 provides an example of firewall code that places the firewall into a bridge configuration.

As shown in FIG. 1, a typical business network would include a plurality of workstations 10 and at least one server 11. For purposes of illustration, the business may be a restaurant that includes a plurality of workstations that waitpersons use to record food orders and settle checks by appropriate charges to credit card accounts. The transactions are stored on a server 11 and are settled in batches over the Internet 15 at any convenient time. The workstations 10 and server(s) 11 are connected to a switch 12 which in turn is connected to a router 13. The router is connected to the Internet 15 via a modem 14. As is known in the art, the functions of switch 12, router 13, and modem 14 may be provided by one or more physical devices.

To secure the network, the prior art approach as shown in FIG. 2 is to replace the router with a firewall and have technicians visit the site to ascertain all the required information about the network, including the number and type of network-connected devices, their IP addresses, etc., and then make the necessary programming changes and settings for the firewall. This process has all of the disadvantages of the prior art mentioned above.

According to the present invention, a known firewall 17 as indicated in FIG. 15 (e.g. model SSG-5-SB-M manufactured by Juniper) is sent to the restaurant, for example, with instructions on how to connect it to the network. This requires minimal computer skills. The Juniper is put inline with the network traffic. If the site has an existing router, a non-technical person at the site disconnects a network device from the existing router, and the Juniper 0/0 port is connected to that port on the site's router (FIG. 8, 306-307). If the site's network does not have a router, the Juniper's 0/0 port is connected to the Ethernet/LAN port on the site's Internet connection device (FIG. 8, 308). The site's network devices are then connected to the Juniper's open ports, 0/2-0/6, or to a switch that is connected to one of those ports (FIG. 8, 309). The person performing the installation then powers on the firewall (FIG. 8, 310). This configuration adds the Juniper firewall to the network without disrupting the flow of network traffic. To accomplish this, the firewall is sent to the site in a bridge-mode configuration that transparently passes data between the firewall interfaces. For example, FIG. 16 provides VST code that places the Juniper firewall into a bridge-mode configuration.

In order to avoid changing the IP address for each of the network devices, several steps must be performed with respect to the firewall. Any device that attempts to communicate to the Internet uses its default gateway address which will generally be that of the original router. With the original site deployment of the firewall in bridge-mode, the firewall will not interrupt this flow of network traffic. Upon converting the firewall to route-mode, however, the LAN side of the firewall must take over the role of the default gateway for the local network, and the default gateway for the firewall must be set to the LAN IP address of the router, which is now also the firewall's LAN address. To accomplish this task, the firewall must support virtual routers. The Juniper SSG series firewalls have two default virtual routers called "Trust-VR" and "Untrust-VR" indicated as VR1 and VR2, respectively, in FIG. 3 within firewall 19. Route-mode configuration starts by putting the firewall LAN interface into the TRUST-VR. The next step is to set the default gateway of the Trust-VR to the Untrust VR. The firewall WAN interface is then put into the Untrust-VR. The firewall WAN interface IP address can be set to any legitimate IP address on the LAN network other than the LAN interface IP address.

Finally, the default gateway for the Untrust-VR is set to the LAN IP address of the site's router. This IP address in the Untrust-VR is also the same as the firewall's LAN interface IP address. Packets from the firewall's LAN interface can now route out of the firewall. Returning packets are properly routed because the firewall has session data which is evaluated before a route lookup and therefore has a path back to the initiating host.

Once route-mode is enabled, FIG. 4 illustrates how the VPN communicates so that renumbering the IP addresses at the site is not necessary. First, in order to solve the problem of identical networks communicating through a VPN network, the system uses IP masquerading, also known as NAT.

A backbone network whose IP network is 1.0.0.0/8 is created. Each site is given a network segment in the form of 1.X.Y.0/24 that is unique across the entire VPN.

Backbone firewalls need to have the corresponding security association information configured to setup a site's VPN. The X and Y are created sequentially so that a starting and ending range of X's and Y's belong to a specific backbone firewall. In the VST design, not all backbone Juniper firewalls can terminate the same number of security associations. Depending on the rate of growth, it might not be feasible initially to purchase all of the backbone firewalls required to be able to support the number of security associations that ultimately will be needed. As a result, VPN growth cost can be tied to the number of security associations that need to be created by mapping X and Y values to a specific backbone firewall. For example, 1.4.0.0 to 1.7.255.0 belong to backbone firewall 1, and 1.8.0.0 to 1.15.255.0 belong to backbone firewall 2. In this way, when additional security associations are required backbone firewall 3 may be purchased. The firewalls use either static routes or dynamic routing protocols to intercommunicate with each other.

Domain Name System (DNS) servers are set up to respond to requests for records that belong to the backbone network. These servers are part of the public domain, so that LAN to LAN requests can be made at sites that are on the VPN without requiring changes to the current DNS settings of the hosts.

The site's firewall performs the NAT translation between the LAN network and the site's backbone addresses. A loopback interface is used to hold the NAT table, so that multiple physical interfaces can be set up allowing for multiple fault tolerant paths to the Internet.

A detailed example is shown in FIG. 4. As shown in FIG. 4, firewalls managed by the present invention could potentially have the same subnets on their local networks. In FIG. 4, all three subnets are 192.168.1.0/24. Since site to site communication over the VPN is possible, a NAT system is required. The invention's implementation of NAT allows for this communication without having to renumber the site.

The process begins by assigning each site a backbone subnet of 1.X.Y.0/24 that is unique on the VPN. Each local device that is accessible over the VPN is mapped in a NAT table in that site's local firewall to a 1.X.Y.Z/32 address which is unique to the VPN. Since users prefer to use names rather than IP addresses to access hosts and NAT addresses may need to change in the future, publicly accessible DNS servers are used to map DNS A-record names to the VPN NAT host addresses. The DNS servers are public so that hosts can access the records without changing their local host DNS server settings.

If, for example, WRK1 at store1 of location mac-001 needs to communicate to WRK1 at store2, then WRK1 at store1 would first query its public DNS servers to obtain the 1.X.Y.Z/32 address for WRK1 at store2, 1.10.16.2, in this case. A data packet then could be sent to that address which would be interpreted by the site's firewall as an address that belongs on the VPN (rather than the Internet). This causes the firewall to translate the source address of WRK1 at store1 to 1.10.15.2 and then forward the packet over the VPN to the backbone firewalls. The backbone firewalls know how to address all 1.X.Y.0/24 sites via destination table look ups and would forward the packet to the firewall at store2. When the firewall at store2 received these packets, it would translate the destination address to the appropriate local address, 192.168.1.10 in this case, and pass the packets to WRK1 at store2. When WRK1 at store2 replies to WRK1 at store1, the process will work in reverse. WRK1 at store2 will send its response to WRK1 at store1, 1.10.15.2 in this case, which will be interpreted by the firewall at store2 and sent over the backbone VPN to the firewall at store1. When the firewall at store1 receives the packets, it will translate the destination address back to the local address of WRK1 at store1, 192.168.1.10 in this case, and forward the packets. This example demonstrates successful communication over the VPN between devices with the same local IP address.

As mentioned above, another important aspect of the invention is the ability to prevent unauthorized network access from within the site. In order to thwart such a security breach, VST has developed a Windows-based software client that operates on the LAN side of the firewall. VST calls this client software the "VST Client." The VST Client implements Rogue Device Detection to provide notification whenever an unauthorized device is detected by the firewall. The VST Client implements Rogue Device Prevention to prevent unauthorized devices from passing traffic through the firewall.

The VST Client keeps a record of all IP address/MAC address pairs which are authorized to access the network. This record, which VST calls the "Reference ARP Table", is stored in the VST Client's encrypted configuration file. Changes to the Reference ARP Table can be made by VST personnel using the VST Tracking application. These changes are then transmitted to the VST Client via the VST Client Web Service. Using the VST Tracking application, VST personnel can choose to have unauthorized devices prevented from communicating through the firewall (Rogue Device Prevention), or to have the presence of unauthorized devices on the network merely reported (Rogue Device Detection).

To implement Rogue Device Prevention, the VST Client configures the firewall ARP table so that only devices with an IP address/MAC address pair in the Reference ARP Table may pass traffic through the firewall. This is done by making all ARP entries on the firewall static. If an IP address/MAC address pair is authorized to access the network, a static entry is made to the firewall ARP table using this IP address/MAC address pair. For all IP addresses which are on the subnet, but not authorized to access the network, a static entry is made to the firewall ARP table using a randomly generated, fictitious MAC address, thus preventing network traffic passing through the firewall from this IP address.

To implement VST Rogue Device Detection, the VST Client retrieves the current ARP table from the firewall and checks that it matches the Reference ARP Table. If there are devices on the network that are not authorized, the VST Client reports this fact via the VST Client Web Service, which in turn alerts VST personnel.

The functionality of the software programs will now be described.

VST Tracking is a Microsoft DotNet 3.5 software application developed by VST that provides a User Interface to a SQL Database. Through this interface VST employees can send instructions to the VST Client to support the network at any site. VST Tracking is also used by VST to track security deployments, customer specific data, remote access permissions, firewall inventory, and the associations between resellers, owners, customers and locations (sites).

The VST Client Web Service is a Microsoft DotNet 3.5 web service developed by VST that provides a method for the VST Client to make use of data in the SQL Database. The VST Client Web Service publishes a set of Internet available commands for use by the VST Client.

The VST Client is a Microsoft DotNet 2.0 software application developed by VST that provides a VST presence on the site's local network. It periodically makes an SSL encrypted call over the public Internet to the VST Client Web Service. If the SQL database contains a command for the VST Client to execute, the command is returned to the VST Client by the VST Client Web Service. The commands available in the SQL database are entered by the VST Tracking program through VST personnel's interaction with the VST Tracking user interface. This sequence of events is illustrated in FIG. 5.

As shown in the flowcharts illustrated in FIG. 6 through FIG. 12, the process of installing and configuring the present invention involves seven steps. An optional step 8 is described in FIG. 13.

Step one in the process begins by VST personnel entering initial information about the site into a database through the VST Tracking application (FIG. 6, 100). Next, a person at the site downloads the VST Client application to one of the servers or workstations on the local network. The VST Client installer is available on a public web server and the application is installed via the Internet on one of the local workstations or servers (FIG. 6, 101-103). There are other known methods of loading the VST Client application on the local network; for example, by loading the client application on a hard disk or flash drive and physically sending it to the site for installation. Once the VST Client installation is complete, the VST Client ID must be registered (FIG. 6, 104-106). The VST Client ID is a unique identifier supplied by VST for each instance of the VST Client. The VST Client provides a user interface that allows the person at the business to enter the unique VST Client ID and initiate the registration of the VST Client at that site. The VST Client is designed to communicate back to the VST network over the Internet for updating itself and receiving command execution instructions.

Step two prompts the VST Client to conduct a LAN Scan. This process is shown in FIG. 7. Using the VST Tracking application, VST personnel will request that a LAN Scan be performed by the VST Client at a selected site. This command is stored in a database and transmitted to the VST Client via the VST Client Web Service (FIG. 7, 201-205).

When performing a LAN Scan the VST Client gathers the following data and then returns it to the VST Client Web Service which stores the data in a database where it may be accessed by VST personnel via the VST Tracking application (FIG. 7, 206-214):

ipconfig /all;
nbtstat -a -n;
nbtstat -c;
nbtstat -n;
nbtstat -r;
netstat -a;
route print;
ping for all addresses on the host machine's subnet; and arp -a;
ping -a for all addresses on the host machine's subnet that responded to ping (FIG. 7, 207);
tests and reports if a TCP connection can be made to the address of the VST firewall management server. This address is specified in the command received from the VST Client Web Service (FIG. 7, 208);
tests and reports if a UDP connection can be made for IPSEC (port 4500, port 00) to the address of the VST VPN. This address is specified in the command received from the VST Client Web Service (FIG. 7, 209);
trace route (i.e., tracert) to an address specified in the command received from the VST Client Web Service; and
retrieves the current ARP table from the firewall (FIG. 7, 210-213).

All of this information is then sent to the VST Client Web Service to be stored in a database for later analysis by VST personnel (FIG. 7, 214-215).

Step three is to install the firewall on the site's local network as shown in FIG. 8. Before the firewall is shipped, a distributor updates the firewall with the current firmware version (FIG. 8, 301). The distributor configures the firewall to bridge-mode using the VST bridge-mode code as previously described (FIG. 8, 302). All firewalls are shipped with a default configuration that allows the VST Client to access the firewall via IP address 1.0.0.1. Throughout the configuration, this IP address will always be available either as a VLAN interface in bridge-mode, or as a secondary IP address in route-mode. The distributor then ships the physical firewall to the site for installation in bridge-mode (FIG. 8, 303). A non-technical person at the site physically installs the firewall into the existing local network, as previously described (FIG. 8, 305-310).

In step four, the firewall gathers information into its logs (FIG. 9, 401).

In step five, through the VST Tracking application, VST personnel request that firewall logs be retrieved by the VST Client at a selected site. This command is stored in a database and transmitted to the VST Client via the VST Client Web Service (FIG. 10, 501-505).

These logs can be quite large. To avoid timeout issues when communicating with the firewall, the VST Client uses a TFTP server to receive the logs from the firewall. To facilitate this, a TFTP server is built into the VST Client. To handle the fact that the VST Client host machine may have more than one IP address while only one of these addresses may be used by the firewall to send data to the VST Client's TFTP server, the VST Client employs an algorithm for intelligently selecting the IP address most likely to be accessible to the firewall. In some network topologies, this algorithm will not make the correct choice. In these circumstances, the VST Tracking application may be used to store a preferred TFTP server address for the VST Client. The preferred TFTP server address (if any) is passed to the VST Client by the VST Client Web Service. The VST client starts its TFTP server on the appropriate IP address (FIG. 10, 507-509).

On machines running the Windows Firewall, the Windows Firewall is temporarily configured to allow the TFTP transmission of the logs (FIG. 10, 510-511). When the TFTP transmission is completed, the Windows Firewall is restored to its former status (FIG. 10, 519-520).

The VST Client then connects to the firewall and instructs it to send the event and traffic logs to the TFTP server (FIG. 10, 512-514). The logs are then read by the VST Client and returned to the VST Client Web Service (FIG. 10, 515-516). When the logs have been returned, the log files are deleted from the host machine and the TFTP server is stopped (FIG. 10, 517-518). The VST Client Web Service then stores the logs in a database where they may be accessed by VST personnel using the VST Tracking application (FIG. 10, 521).

Once all the data has been collected, it is analyzed and the firewall can be programmed remotely.

In step 6, VST personnel will instruct the VST Tracking application to generate a configuration file for a firewall at a selected site from a user-supplied template and configuration data for the location as stored in a database (FIG. 11, 601-603). The firewall configuration is then stored in a database (FIG. 11, 604).

In step 7, using the VST Tracking application, VST personnel will designate a configuration file to be used to program the firewall to route-mode at a selected location (FIG. 12, 701-702). The command to configure the firewall is transmitted to the VST Client via the VST Client Web Service (FIG. 12, 703-705). When the VST Client receives a file to use for programming the firewall it starts the built-in TFTP server (FIG. 12, 707-709), reconfigures the Windows Firewall if needed (FIG. 12, 710-11), logs into the firewall (FIG. 12, 712-713), saves the current firewall configuration (FIG. 12, 714), programs the firewall with the new configuration (FIG.

12, 715) and tests to be sure that the new configuration allows the minimum required connectivity. This includes verifying that the VST Client can ping the firewall (FIG. 12, 716) and that the VST Client can ping the VST collocation facility through the firewall (FIG. 12, 719).

If the new configuration does not allow the minimum required connectivity, the VST Client will restore the previous firewall configuration (FIG. 12, 717).

The VST Client then stops the TFTP server (FIG. 12, 720), restores the Windows Firewall configuration if needed (FIG. 12, 721-722), and reports the success or failure of the update to the VST Client Web Service (FIG. 12, 723). This completes the installation process with the firewall configured to route-mode.

An optional step 8, shown in FIG. 13, allows a site that has an existing router to remove the router once the invention is in place. This optional step only applies if the site had an onsite router prior to installation of the invention (FIG. 13, 801), and there is a desire to remove the router (FIG. 13, 803). Using the VST Tracking application, VST personnel generate a new configuration file for the firewall to allow the firewall to take over the Internet gateway functionality handled by the router (FIG. 13, 805). The standard firewall configuration process, as described in FIG. 12, is performed to update the firewall configuration. During this process, between FIG. 12, 715 and 716, a non-technical person at the site moves the cable from the router's WAN/Internet port to the Juniper 0/0 port (FIG. 13, 809). If successful, then the process is complete (FIG. 13, 810-811). If the new configuration fails, the VST Client restores the previous firewall configuration (FIG. 13, 812), a non-technical person at the site moves the cable back to the router's WAN/Internet port (FIG. 13, 813) and the site is restored to its previous state. VST personnel can then use information gathered from the update failure to diagnose the problem, create a new firewall configuration, and attempt the router removal again (FIG. 13, 814). All this can be accomplished with minimum downtime for the location and handled without placing technical personnel onsite.

The flowcharts illustrated in FIG. 14 describe the set up and enforcement of Rogue Device Detection and Rogue Device Prevention, which are part of the invention that further protect the local network once the firewall is installed.

To enable Rogue Device Detection or Rogue Device Prevention, the VST Tracking user interface is used to indicate whether dynamic or static ARP table control is to be implemented for each firewall interface (FIG. 14, 901-902). Rogue Device Detection is implemented via dynamic ARP table control. Rogue Device Prevention is implemented via static ARP table control. VST Tracking generates firewall configuration data in the firewall's command line interface (CLI) language to clear all static entries for all addresses on all firewall interfaces (FIG. 14, 903).

For each firewall interface that is configured for static ARP table control (FIG. 14, 904), and for each address on such an interface's subnet, VST Tracking determines if the Reference ARP Table held in a database contains the IP address (FIG. 14, 907). If it does, VST Tracking retrieves the MAC address for the selected IP address from the Reference ARP Table (FIG. 14, 909). If not, VST Tracking generates a random, fictitious MAC address (FIG. 14, 908). VST Tracking then uses the MAC address to append additional commands to the firewall configuration data that will create a static ARP table entry for the selected IP address/MAC address pair (FIG. 14, 910). Once all addresses on each interface's subnet have been handled, VST Tracking writes the Update ARP Table command to a database (FIG. 14, 911).

When the VST Client receives the Update ARP Table command, it receives the following information with the command: list of all interfaces under dynamic ARP control, list of all interfaces under static ARP control, copy of the Reference ARP Table from a database and the firewall configuration data (i.e., firewall CLI language commands) generated by VST Tracking (FIG. 14, 915).

The VST Client saves the lists of static and dynamic interfaces to its local encrypted configuration file (FIG. 14, 916-917).

The VST Client determines whether or not the updates to the firewall ARP table will continue to allow the firewall to communicate with the VST Client's TFTP server (FIG. 14, 919). If not, the VST Client aborts the command and reports the problem to the VST Client Web Service (FIG. 14, 922).

Otherwise, the VST Client saves the ARP table configuration to its encrypted configuration file (FIG. 14, 920). The VST Client then uses the configuration data that contains the sequence of firewall CLI commands to update the firewall ARP table via a Merge Configuration command (FIG. 14, 921). This completes the setup and configuration of the VST Client and the firewall for Rogue Device Detection and Prevention and enables enforcement of Rogue Device Detection and Prevention.

During the VST Client's polling cycle (FIG. 14, 923), for all firewall interfaces under dynamic ARP table control, the VST Client compares the Reference ARP Table with the firewall's current ARP table (FIG. 14, 924). If there are any IP address/MAC address pairs in the firewall ARP table that are not in the Reference ARP Table (FIG. 14, 925), then the VST Client sends an alert to VST Tracking via the VST Client Web Service (FIG. 14, 926).

Also during the VST Client's polling cycle, for all firewall interfaces under static ARP table control, the VST Client compares the Reference ARP Table with the firewall's current ARP table (FIG. 14, 928). If there are any IP address/MAC address pairs in the firewall ARP table that are not in the Reference ARP Table (FIG. 14, 929), or if there are any IP address/MAC address pairs in the Reference ARP Table that are not in the firewall ARP table as static entries (FIG. 14, 930), then the VST Client sends an alert to VST Tracking via the VST Client Web Service (FIG. 14, 931) and attempts to reconfigure the firewall ARP table to match the Reference ARP Table (FIG. 14, 932). If it is unable to do this, the VST Client sends an alert to VST Tracking via the VST Client Web Service (FIG. 14, 934). In all cases, the VST Client continues to execute its normal polling cycle (FIG. 14, 935).

Although the present invention has been described with respect to specific details, it is not intended that such details should be regarded as limitations on the scope of the invention, except to the extent that they are included in the accompanying claims.

What is claimed is:

1. A method for deploying a firewall and virtual private network to a computer network having at least one computer and a connection to the Internet with backbone servers thereon, the method comprising:
   programming the firewall with generic bridge mode code which sets the firewall to bridge mode and causes the firewall to serve as a bridge allowing all traffic to pass transparently through the firewall and logging computer network traffic data;
   shipping the firewall to the computer network location;
   installing the firewall between the Internet connection device and any existing switch on the computer network;
   generating route mode code based on the computer network traffic data gathered while in bridge mode;

converting the firewall from bridge mode to route mode, such conversion comprising: programming the firewall from the inside to the outside, wherein the backbone servers are called over the Internet and the route mode code is received back, where the route mode code is then uploaded to the firewall's LAN interface;

validating the firewall's route mode configuration, such validation comprising: establishing communication from the inside to the outside creating an inside to outside communication path, wherein the backbone servers are called over the Internet and either an acknowledgement is received back or the computer network traffic data is logged, the firewall is reverted to bridge mode, the computer network traffic data is sent to the backbone servers for analysis and Internet connectivity downtime for the computer network is minimized; and providing, by the backbone server, a set of recursive Domain Naming System (DNS) servers that allow for DNS resolution independent of the Internet Service Provider (ISP) for the computer network and that ensure devices on the computer network use these DNS servers for IP redirection.

2. The method of claim 1 wherein the firewall's generic bridge mode code eliminates the need for customization prior to installation at the computer network location.

3. The method of claim 1 wherein the firewall's generic bridge mode code logs computer network traffic which is sent to the backbone servers for analysis, and enables the generation of the route mode code, thereby eliminating need for personal on-site analysis at the computer network's location.

4. The method of claim 1 wherein the firewall has the capability to support the same Internet Protocol (IP) address on both the firewall's LAN and WAN interfaces thereby enabling the LAN side of the firewall to take the role of the original computer network default gateway and the WAN side to continue to communicate to the Internet using the original computer network default gateway, avoiding the need to renumber the Internet Protocol (IP) addresses of the computer network.

5. The method of claim 1 wherein once the firewall route mode configuration is validated, the firewall is added to a firewall management application system for monitoring and change control, the firewall application management system being capable of managing thousands of firewalls without the need for static Internet Protocol addresses to minimize Internet costs, and all communication occurs from the inside to the outside thereby eliminating the need to communicate directly to the WAN side of the Internet connection device or to open pinholes for communication through the firewall.

\* \* \* \* \*